(12) United States Patent
Schneider

(10) Patent No.: US 10,703,325 B2
(45) Date of Patent: Jul. 7, 2020

(54) MULTI-CHAMBERED SIDE AIRBAG ASSEMBLIES

(71) Applicant: AUTOLIV ASP, INC., Ogden, UT (US)

(72) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 155 days.

(21) Appl. No.: 15/823,137

(22) Filed: Nov. 27, 2017

(65) Prior Publication Data

US 2019/0161050 A1 May 30, 2019

(51) Int. Cl.
  *B60R 21/233* (2006.01)
  *B60R 21/2338* (2011.01)
  *B60R 21/207* (2006.01)
  *B60R 21/231* (2011.01)
  *B60R 21/00* (2006.01)

(52) U.S. Cl.
  CPC ........ *B60R 21/233* (2013.01); *B60R 21/2338* (2013.01); *B60R 21/23138* (2013.01); *B60R 21/207* (2013.01); *B60R 2021/0055* (2013.01); *B60R 2021/23146* (2013.01); *B60R 2021/23308* (2013.01); *B60R 2021/23386* (2013.01)

(58) Field of Classification Search
  CPC ............ B60R 21/233; B60R 21/23138; B60R 21/231; B60R 21/2338; B60R 21/207; B60R 21/21; B60R 2021/23308; B60R 2021/23146; B60R 2021/23386; B60R 2021/0055; B60R 2021/0004
  USPC ............. 280/730.2, 729, 743.1, 743.2, 730.1
  See application file for complete search history.

(56) References Cited

U.S. PATENT DOCUMENTS

2012/0126518 A1* 5/2012 Fukawatase .......... B60R 21/207
  280/730.2

* cited by examiner

*Primary Examiner* — Keith J Frisby
(74) *Attorney, Agent, or Firm* — Stoel Rives LLP

(57) ABSTRACT

Multi-chambered side airbag assemblies are provided. The airbag assemblies can include a housing, an inflator, and a side inflatable cushion. The side inflatable cushion can include multiple chambers, for example, a first inflatable chamber coupled to the housing, a second inflatable chamber coupled to the first inflatable chamber, and a third inflatable chamber coupled to the second inflatable chamber. The side inflatable cushion can also include a connector coupling at least two of the inflatable chambers to each other. In a deployed state, at least a portion of the side airbag may protrude transverse to a longitudinal axis of a vehicle such that a portion of the side airbag is configured to receive a vehicle occupant moving from a vehicle occupant position during a vehicle impact event.

19 Claims, 15 Drawing Sheets

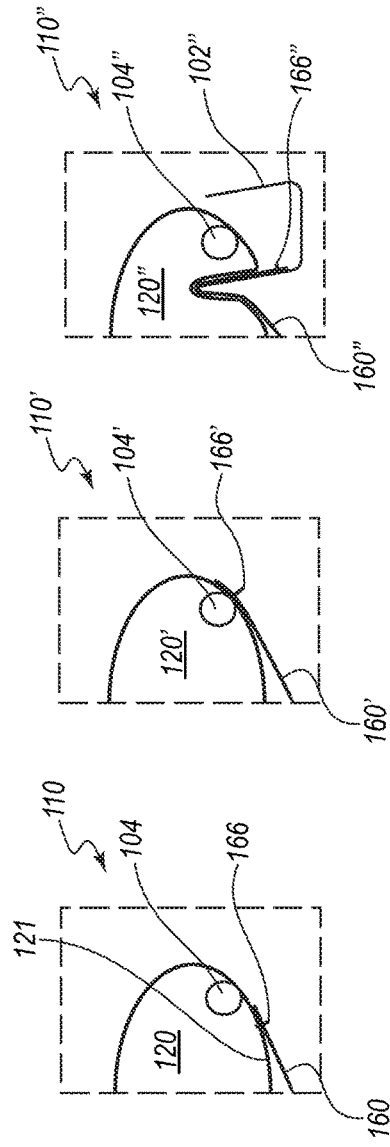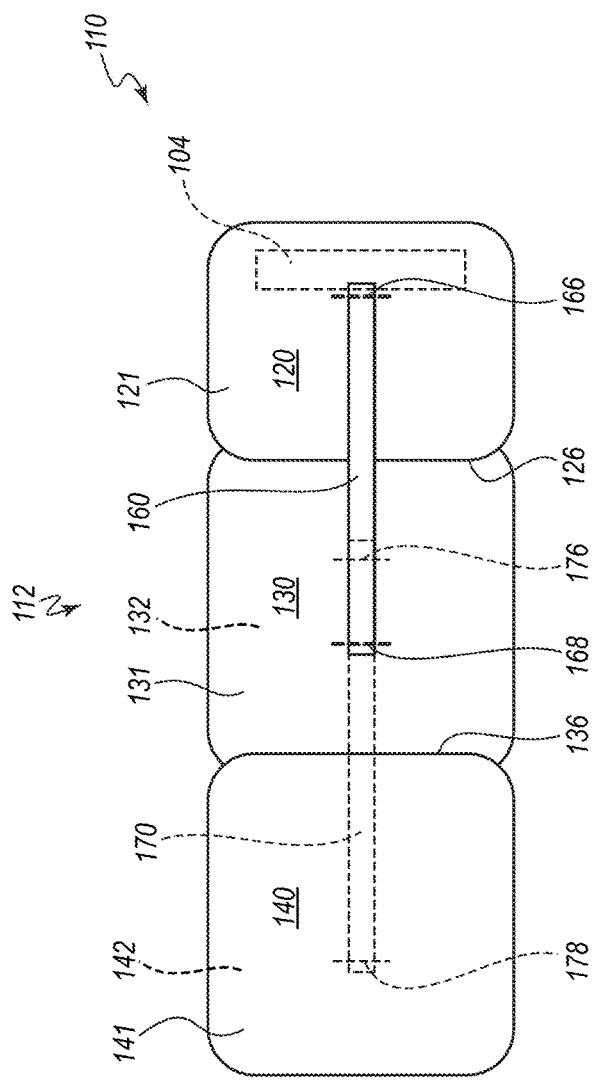

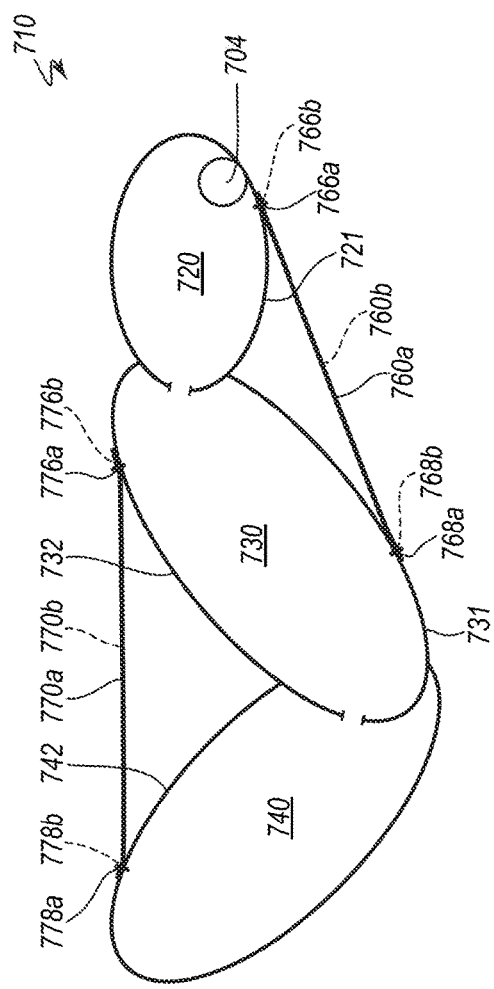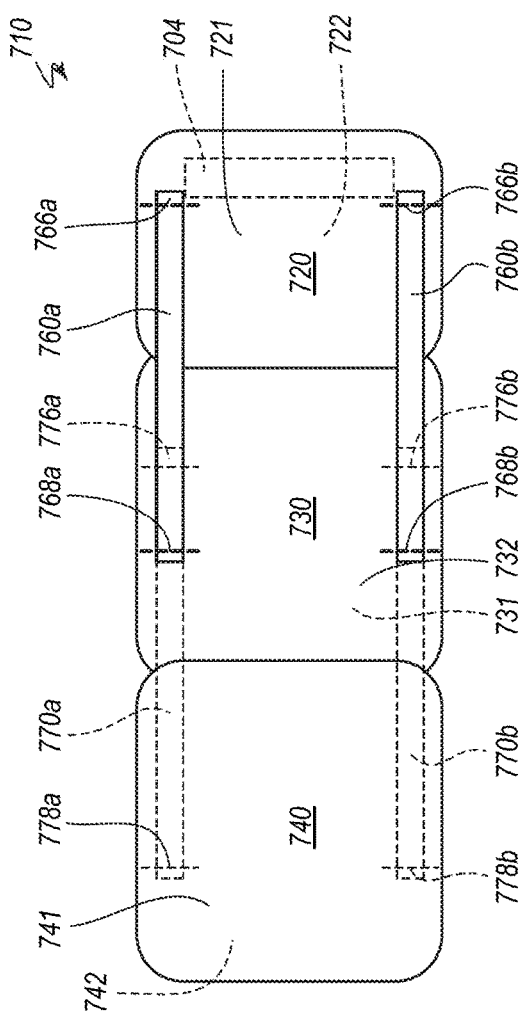

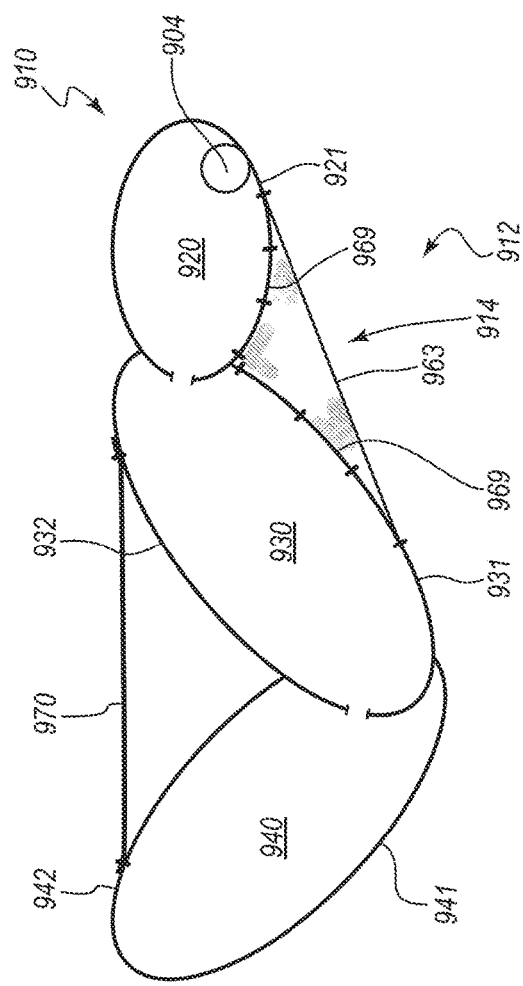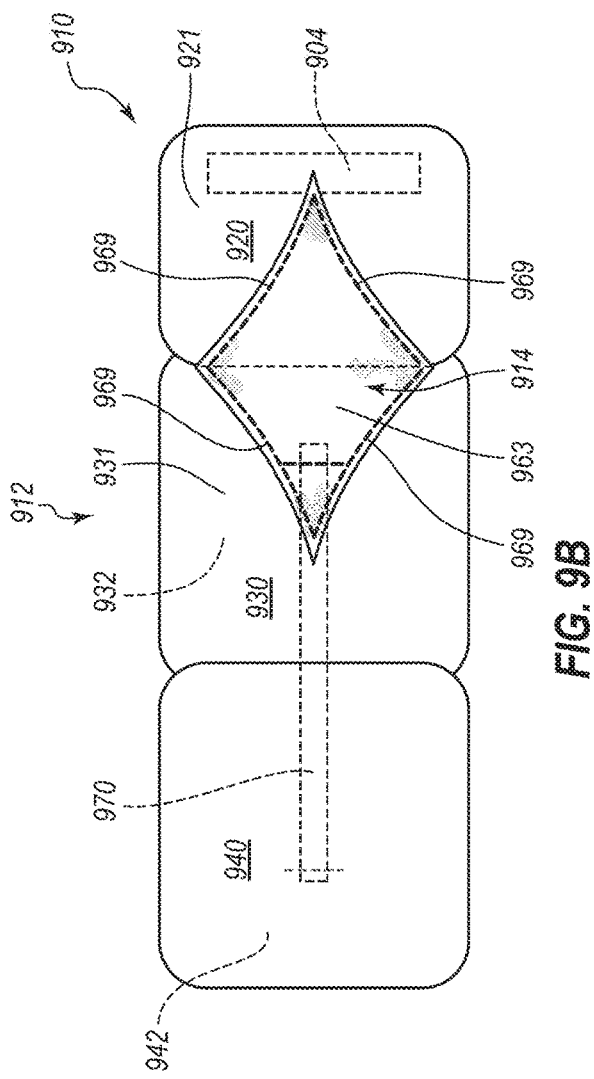

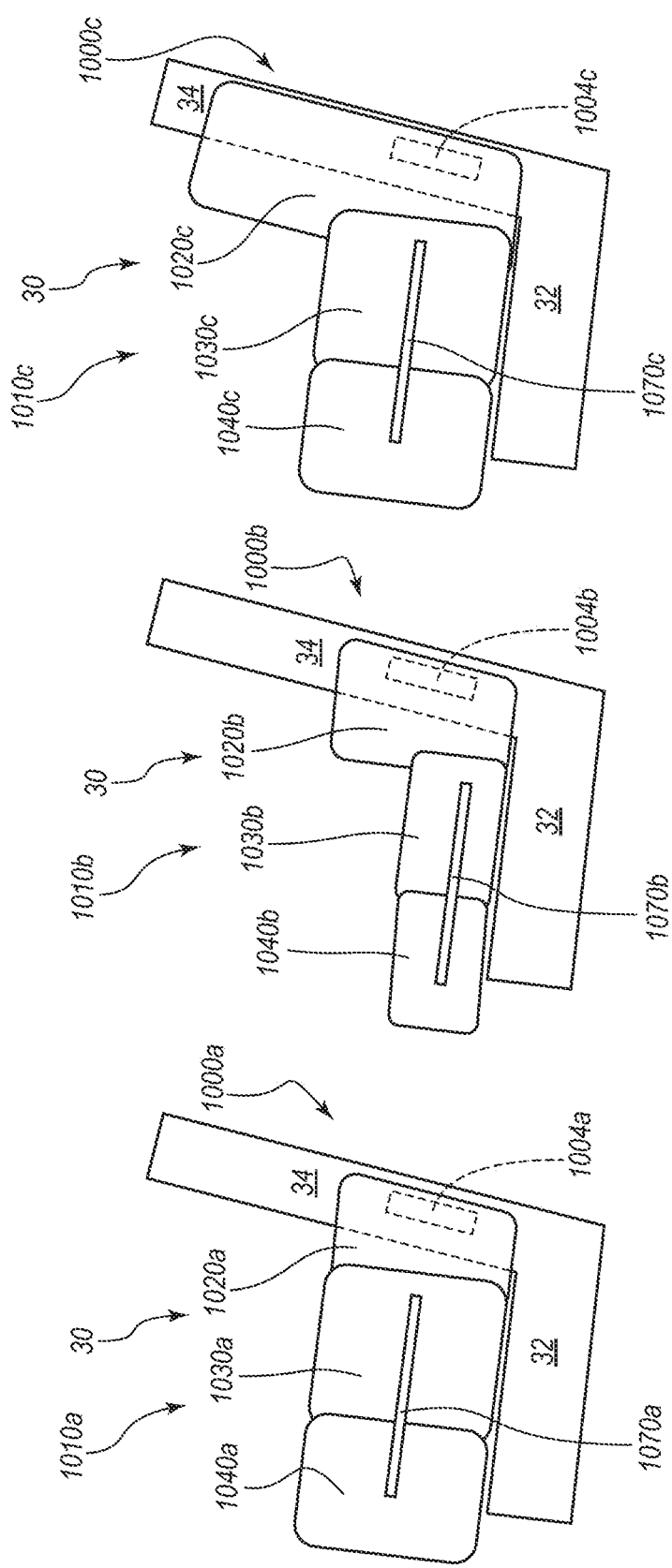

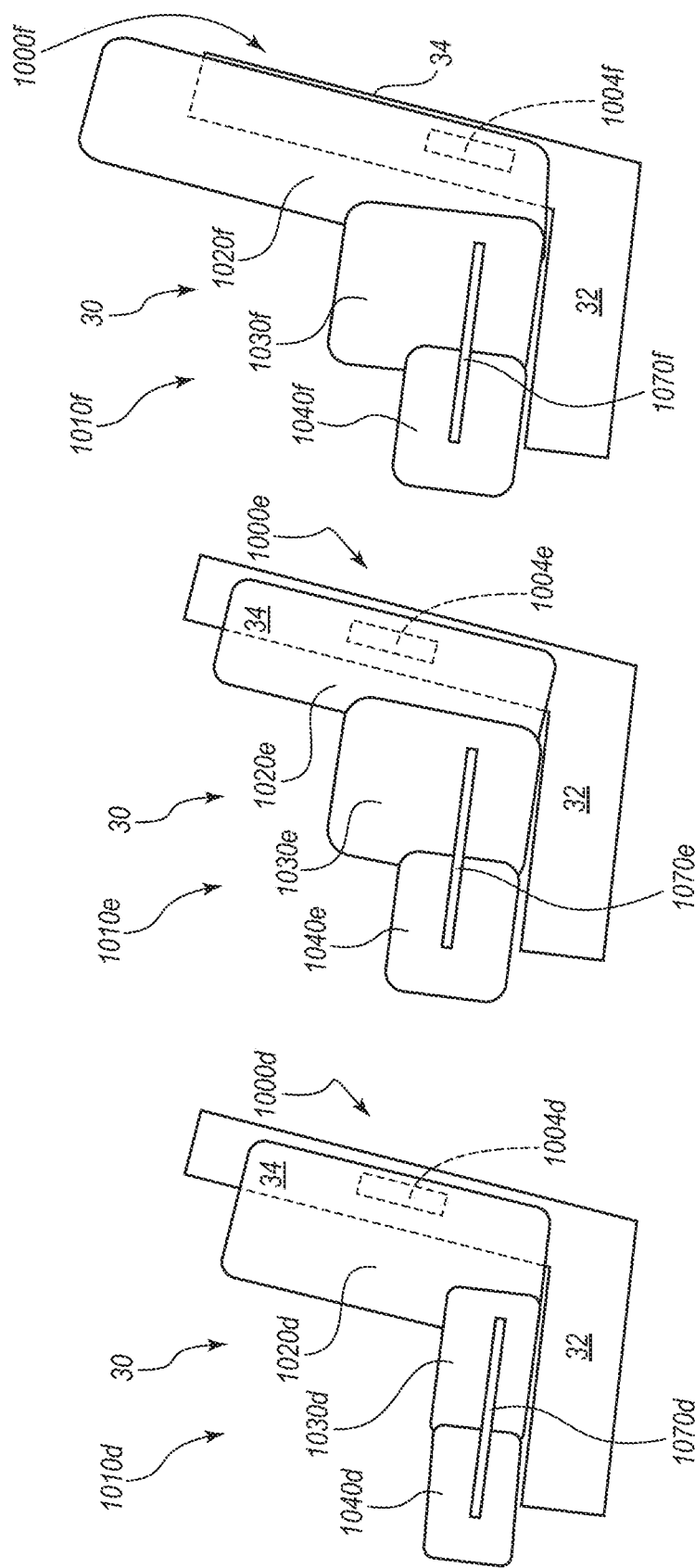

MULTI-CHAMBERED SIDE AIRBAG ASSEMBLIES

TECHNICAL FIELD

The present disclosure relates generally to the field of automotive protective systems. More specifically, the present disclosure relates to frontal airbag systems that are configured to deploy in response to collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

FIG. 5A is a detail view of a portion of the side inflatable cushion of FIG. 3 taken through line 5A.

FIG. 5B is a detail view of another embodiment of a side inflatable cushion, similar to that illustrated in FIG. 5A.

FIG. 5C is a detail view of another embodiment of a side inflatable cushion, similar to that illustrated in FIG. 5A.

FIG. 6 is a side view of the side inflatable cushion of FIGS. 1A-3.

FIG. 7A is a top view of a side inflatable cushion, according to another embodiment of the present disclosure, in a deployed state.

FIG. 7B is a side view of the side inflatable cushion of FIG. 7A in a deployed state.

FIG. 9A is a top view of a side inflatable cushion, according to another embodiment of the present disclosure, in a deployed state.

FIG. 9B is a side view of the side inflatable cushion of FIG. 9A in a deployed state.

FIG. 10A is a side view of a side inflatable cushion, according to another embodiment of the present disclosure, in a deployed state.

FIG. 10B is a side view of a side inflatable cushion, according to another embodiment of the present disclosure, in a deployed state.

FIG. 10C is a side view of a side inflatable cushion, according to another embodiment of the present disclosure, in a deployed state.

FIG. 10D is a side view of a side inflatable cushion, according to another embodiment of the present disclosure, in a deployed state.

FIG. 10E is a side view of a side inflatable cushion, according to another embodiment of the present disclosure, in a deployed state.

FIG. 10F is a side view of a side inflatable cushion, according to another embodiment of the present disclosure, in a deployed state.

DETAILED DESCRIPTION

Figure 1A:
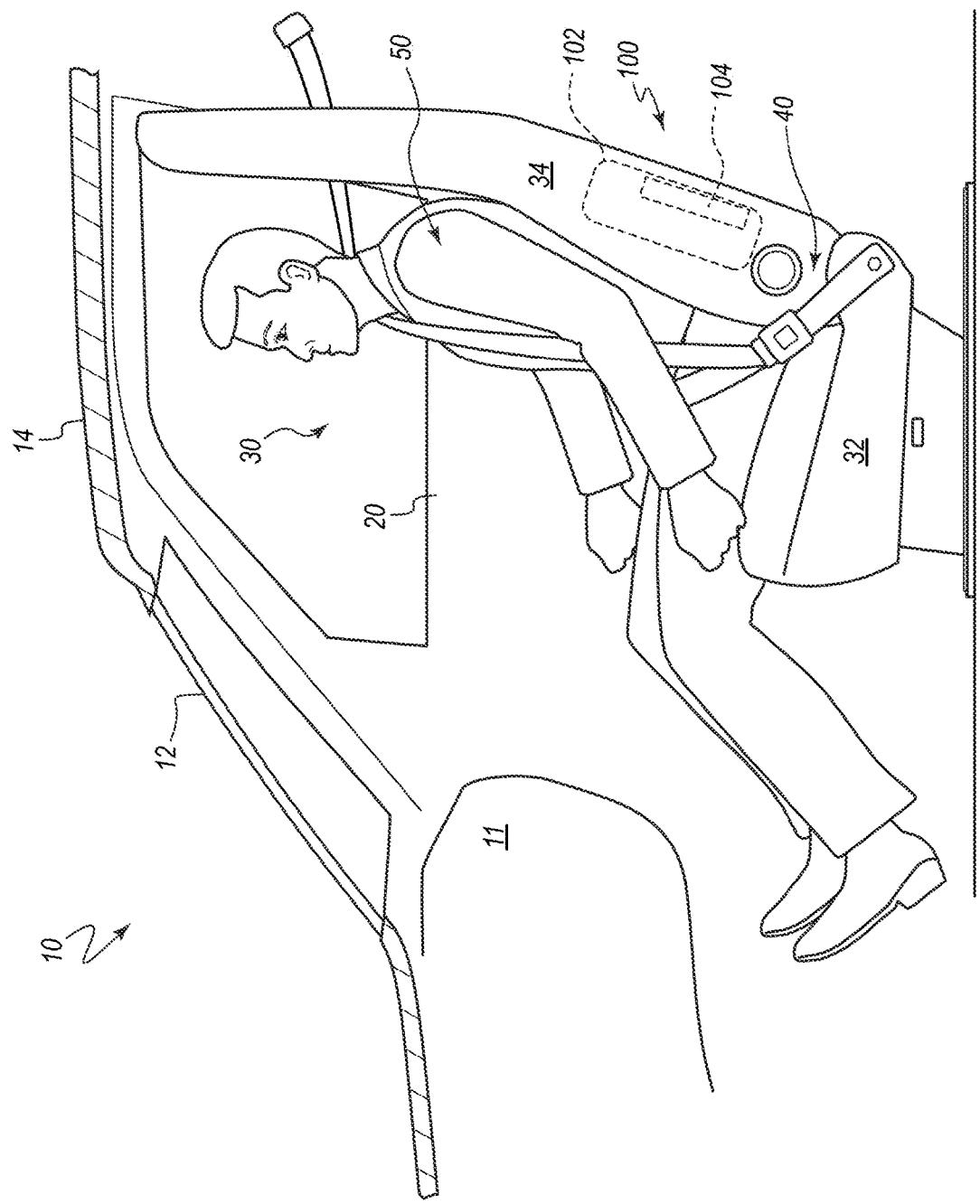
FIG. 1A is a side view of an interior of a vehicle having an airbag assembly, according to one embodiment of the present disclosure, in a packaged and undeployed state.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag assemblies are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. The disclosed airbag assemblies and airbag embodiments may be utilized in place of or in conjunction with other airbags, such as, for example, a front passenger airbag that is typically housed within the dashboard, driver airbags housed within the steering wheel, knee airbags, and side airbags. Further, the disclosed airbag assemblies may be used in an autonomous vehicle (e.g., in a vehicle that may not have a steering wheel and/or that may have limited, or no, reaction surface such as an instrument panel).

As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present.

As used herein, the term "center console" refers to a vehicle structure generally rising to some degree between at least two vehicle occupant positions and which may be a rearward extension of the dashboard or instrument panel. A "center console" may house or support controls (such as, e.g., a transmission shifting control, climate controls, etc.), drink-holders, or storage compartments/trays. A "center console" may also be used to mount airbag-related equipment, or may provide a reaction surface for an airbag.

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand. An inboard component may be situated opposite an outboard component.

The terms "proximal" and "distal" are directional terms used herein to refer to opposite or approximately opposite locations on an airbag cushion. The proximal end or portion of an airbag cushion is the end or portion of the airbag cushion that is nearer the inflator or, in some instances, the housing when the airbag cushion is fully inflated. The distal end or portion is the end or portion of the airbag cushion opposite the proximal end or portion of the airbag cushion, or an end or portion more distant from the inflator or housing than the proximal end or portion. In other words, the terms "proximal" and "distal" are with reference to a point of attachment, such as a point of attachment of the airbag cushion at an airbag assembly housing, and/or a point of attachment of an airbag assembly at a seat back from which an airbag deploys. Specifically, "proximal" is situated toward such point of attachment, and "distal" is situated away from such point of attachment. In some instances, the deployment trajectory may cause a component or portion of an airbag cushion to be "proximal" during a portion of the deployment and inflation, and yet be "distal" during the essential functional phase of employment. In other words, an airbag cushion may be packaged such that as the airbag cushion deploys, a portion or component may alternate from a "distal" to "proximal" orientation, or vice versa. For the purposes of this disclosure, the terms "distal" and "proximal" relate to the intended orientation of the airbag cushion or component once nominally fully deployed.

During installation, the disclosed airbags are typically disposed at an interior of a housing in a packaged state (e.g., are rolled, folded, and/or otherwise compressed) or a compact configuration and may be retained in the packaged state behind a cover. During a collision event, an inflator is triggered, which rapidly fills the airbag with inflation gas. The airbag can rapidly transition from a packaged state (e.g., a compact configuration) to a deployed state or an expanded configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

An airbag assembly can mitigate injury to an occupant of a vehicle during a collision event by reducing the effect of impact of the occupant against structures (body-structure impact) within the vehicle (such as, e.g., a dashboard or door column). Some embodiments disclosed herein can provide improved positioning, cushioning, and/or safety to occupants involved in particular types of collisions. For example, some embodiments can be particularly suited to cushion a vehicle driver and/or front-seat passengers seated adjacent the passenger-side door. Examples of types of collisions in which certain embodiments may prove advantageous include one or more of: (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap front crash test and the NHTSA oblique impact test are disclosed in the Insurance Institute for Highway Safety, Small Overlap Frontal Crashworthiness Evaluation Crash Test Protocol (Version II) (December 2012); and Saunders, J., Craig, M., and Parent, D., Moving Deformable Barrier Test Procedure for Evaluating Small Overlap/Oblique Crashes, SAE Int. J. Commer. Veh. 5(1):172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the car-forward direction.

FIG. 1A is a side view of an interior of a vehicle 10 having an airbag assembly 100 (or multi-chambered side airbag assembly) in a packaged and undeployed state. A dashboard (or instrument panel) 11, windscreen 12, roof 14, and door 20 are shown for reference. A vehicle occupant position 30 is also shown. An occupant 50 is shown in the vehicle occupant position 30 in a seated and upright position. In FIG. 1A, the vehicle occupant position 30 shown is a front passenger location; however, embodiments of the disclosures herein may be suitable for other vehicle occupant positions 30 within the vehicle 10. The vehicle occupant position 30 can include an occupant seat 32, a seat back 34, and a restraint harness 40. The airbag assembly 100 is mounted at an outboard portion of the seat back 34 (distal to the viewing plane of FIG. 1A). The airbag assembly 100 may include a housing 102, an inflator 104, and an airbag cushion (hereafter, side inflatable cushion) (not shown, but see, e.g., 110 in FIG. 1B).

The housing 102 may couple at the seat back 34 such that the housing 102 may be substantially within the seat back 34 and at a position lateral to the vehicle occupant position 30. In another embodiment, the housing 102 may couple at or within the door 20 of the vehicle 10, or another side structure of the vehicle 10. The housing 102 may be formed of any suitable material, and may include a covering (not shown) so as to contain the side inflatable cushion 110 in a compressed, undeployed state. The covering may comprise one or more fabric panels which couple at a perimeter to the housing 102, and a burst seam. Alternatively, the covering may be a rigid or semi-rigid panel which couples at a hinge to the housing 102, or may be a panel which may be fully detachable. In other words, the covering may be formed in any suitable manner which may assist in containing the undeployed side inflatable cushion 110 within the housing 102, protect the undeployed side inflatable cushion 110, and/or permit the side inflatable cushion 110 to exit the housing 102 during inflation and deployment.

The inflator 104 may be an appropriate airbag inflator for the purpose of inflating a side inflatable cushion 110. The inflator 104 can include a gas canister, a chemical container, or other method for generation of inflation gas, and any conduit(s) or ducting (plumbing) for delivering inflation gas to the side inflatable cushion 110, and other components related to generation and delivery of inflation gas. The inflator 104 may be situated wholly within the housing 102, partially within the housing 102, or without a housing.

In FIG. 1A, the side inflatable cushion 110 is in an uninflated, undeployed, compressed state within the housing 102. The side inflatable cushion 110 may be formed from one or more panels of suitable material by means of cutting, folding, bending, turning or otherwise shaping such material, and by application of seams at appropriate locations. Seams may be formed by sewing, adhesive, taping, radio frequency (RF) welding, or any other suitable means. Seams may be gas impermeable, semipermeable, or permeable, as appropriate. The side inflatable cushion 110 may be configured to receive inflation gas from the inflator 104 to expand the side inflatable cushion 110 from a packaged state within the housing 102 to a deployed state.

Figure 1B:
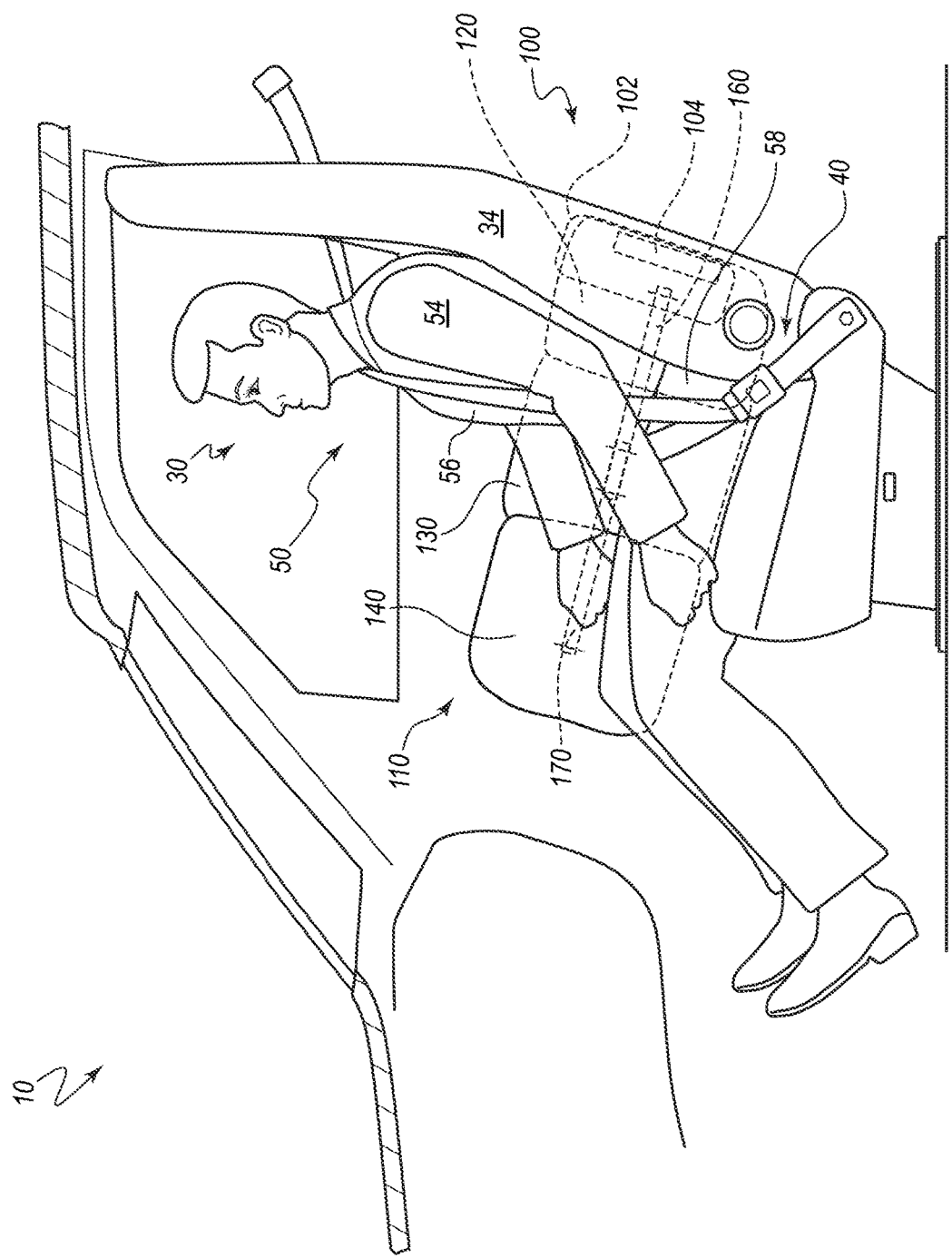
FIG. 1B is a side view of the airbag assembly of FIG. 1A in a deployed state.

FIG. 1B is a side view of the interior of the vehicle 10 having the airbag assembly 100, with a side inflatable cushion 110 in a deployed state and at least partially inflated, and with the occupant 50 seated in an upright position in the vehicle occupant position 30. The inflator 104 has activated and caused the side inflatable cushion 110 to at least partially inflate and to deploy from the housing 102 to a position approximately lateral to the occupant 50. In the embodiment of FIG. 1B, the side inflatable cushion 110 comprises multiple chambers, for example, at least a first inflatable chamber 120, a second inflatable chamber 130, and a third inflatable chamber 140; a first connector (hereafter, distal positioning tether or distal tether) 170; and a second connector (hereafter, proximal positioning tether or proximal tether) 160. The proximal end of the first inflatable chamber 120 couples to the housing 102. The first inflatable chamber 120 and the second inflatable chamber 130 couple to each other at or near the distal end of the first inflatable chamber 120 and the proximal end of the second inflatable chamber 130. The second inflatable chamber 130 and the third inflatable chamber 140 couple to each other at or near the distal end of the second inflatable chamber 130 and the proximal end of the third inflatable chamber 140. The proximal positioning tether 160 may couple at the first inflatable chamber 120 and the second inflatable chamber 130 (further described below). The distal positioning tether 170 may couple at the second inflatable chamber 130 and the third inflatable chamber 140 (further described below).

In the embodiment of FIG. 1B, the heights of the first, second, and third inflatable chambers 120, 130, 140 are substantially equal. In another embodiment, the height of the first inflatable chamber 120 may be greater than the heights of the second and third inflatable chambers 130, 140. In yet another embodiment, the height of the first inflatable chamber 120 may be greater than the height of the second inflatable chamber 130, and the height of the second inflatable chamber 130 may be greater than the height of the third inflatable chamber 140.

With the side inflatable cushion 110 deployed, the second inflatable chamber 130 may be configured to receive at least a portion of a torso 56 of the occupant 50 as the occupant 50 moves from the vehicle occupant position 30. In the embodiment of FIG. 1B, the shoulder 54 of the occupant 50 may be above the height of the side inflatable cushion 110. A configuration such as that shown in FIG. 1B may be particularly suited to use in a vehicle 10 having an inflatable curtain such that the side inflatable cushion 110 and the inflatable curtain do not interfere with each other, but, rather, augment each other.

Figure 1C:
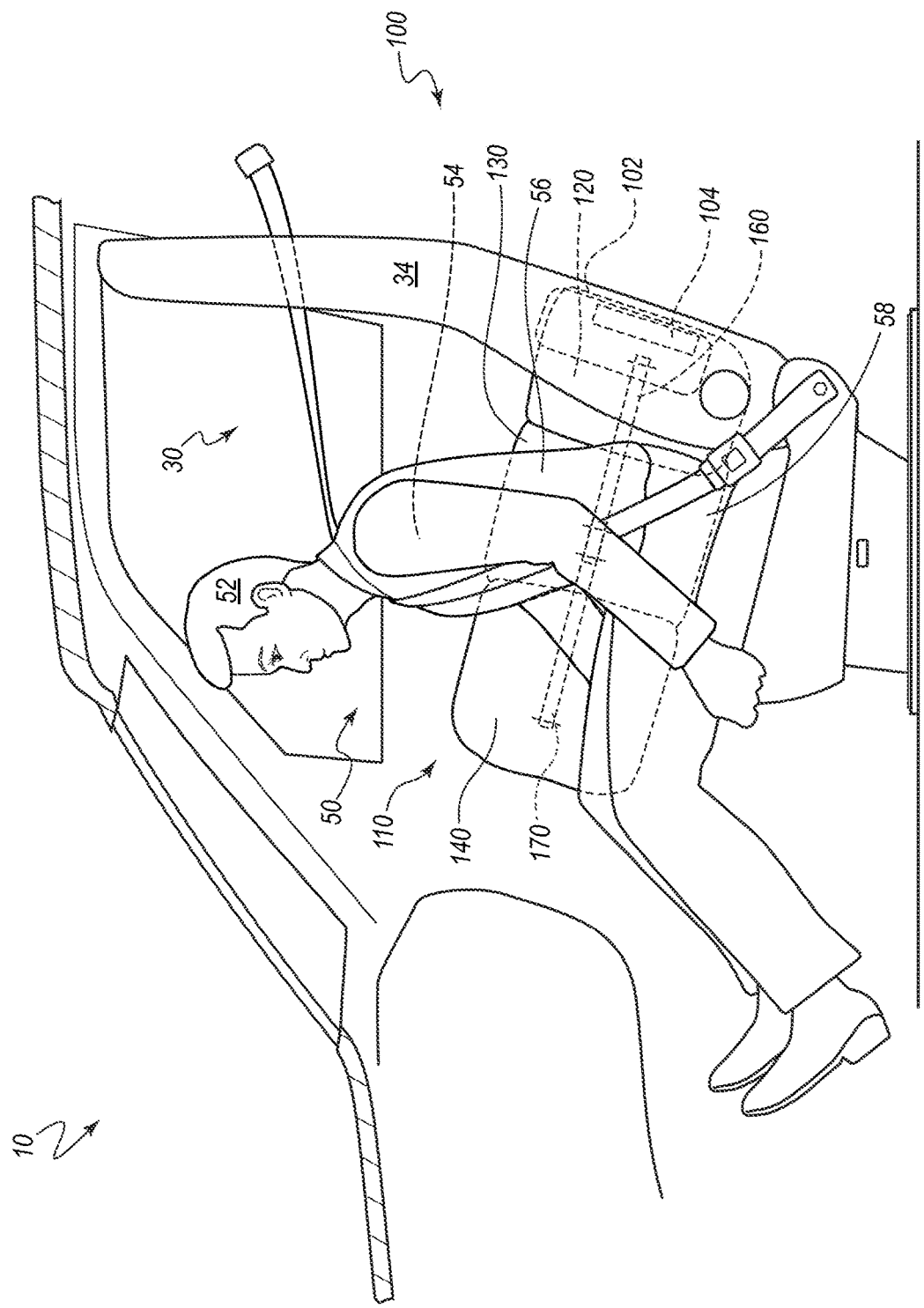
FIG. 1C is a side view of the airbag assembly of FIG. 1A in a deployed state during a vehicle impact event.

FIG. 1C is a side view of the interior of the vehicle 10 having the airbag assembly 100, with the side inflatable cushion 110 in a deployed state and at least partially inflated, and with the occupant 50 engaging the side inflatable cushion 110. The position of the occupant 50 within the vehicle occupant position 30 in FIG. 1C may be representative of one in a frontal collision; however, the airbag assembly 100, and, more particularly, the side inflatable cushion 110 of the airbag assembly 100, may also be suitable for oblique collisions and/or side collisions, as further explained below.

The side inflatable cushion 110 may have been deployed from the housing 102 by action of the inflator 104 and is at least partially inflated. The first inflatable chamber 120, second inflatable chamber 130, and third inflatable chamber 140 are each at least partially inflated. The distal tether (or first connector) 170 is configured to control a shape of the side inflatable cushion 110 in the deployed state such that the second inflatable chamber 130 is disposed within at least a portion of a pathway of the occupant 50 moving from the vehicle occupant position 30 primarily in the forward direction during a vehicle impact event. The proximal tether (or second connector) 160 may further support the second inflatable chamber 130 and assist in disposing the second inflatable chamber 130 forward of the vehicle occupant position 30. The proximal tether 160 and distal tether 170 may cause the second inflatable chamber 130 in the deployed state to protrude transverse to a midline (or toward a longitudinal axis) of the vehicle 10 such that the second inflatable chamber 130 is configured to receive at least a portion of the pelvis 58 of the occupant 50 moving from the vehicle occupant position 30 primarily in a forward direction relative to the vehicle 10 during a vehicle impact event. The disposition of the second inflatable chamber 130 may also configure the second inflatable chamber 130 to receive at least a portion of the torso 56 of the occupant 50. In other words, the second inflatable chamber 130 of the side inflatable cushion 110 may be disposed at least partially forward of the occupant 50 such that at least a portion of the pelvis 58 and torso 56 of the occupant 50 may engage primarily the second inflatable chamber 130 during or immediately after a vehicle collision event.

In FIG. 1C, the airbag assembly 100 is installed to an outboard (relative to the vehicle 10) portion of the seat back 34, or to another outboard structure (e.g., a door post) of the vehicle 10. In this configuration, deployment of the side inflatable cushion 110 can result in the second inflatable chamber 130 being disposed toward the longitudinal axis (centerline) of the vehicle 10. In some embodiments, the airbag assembly 100 may be installed to an inboard (relative to the vehicle 10) portion of the seat back 34, or to another inboard structure (e.g, a center console) of the vehicle 10, resulting in deployment of the side inflatable cushion 110 disposing the second inflatable chamber 130 away from the longitudinal axis (centerline) of the vehicle 10.

Figure 2:
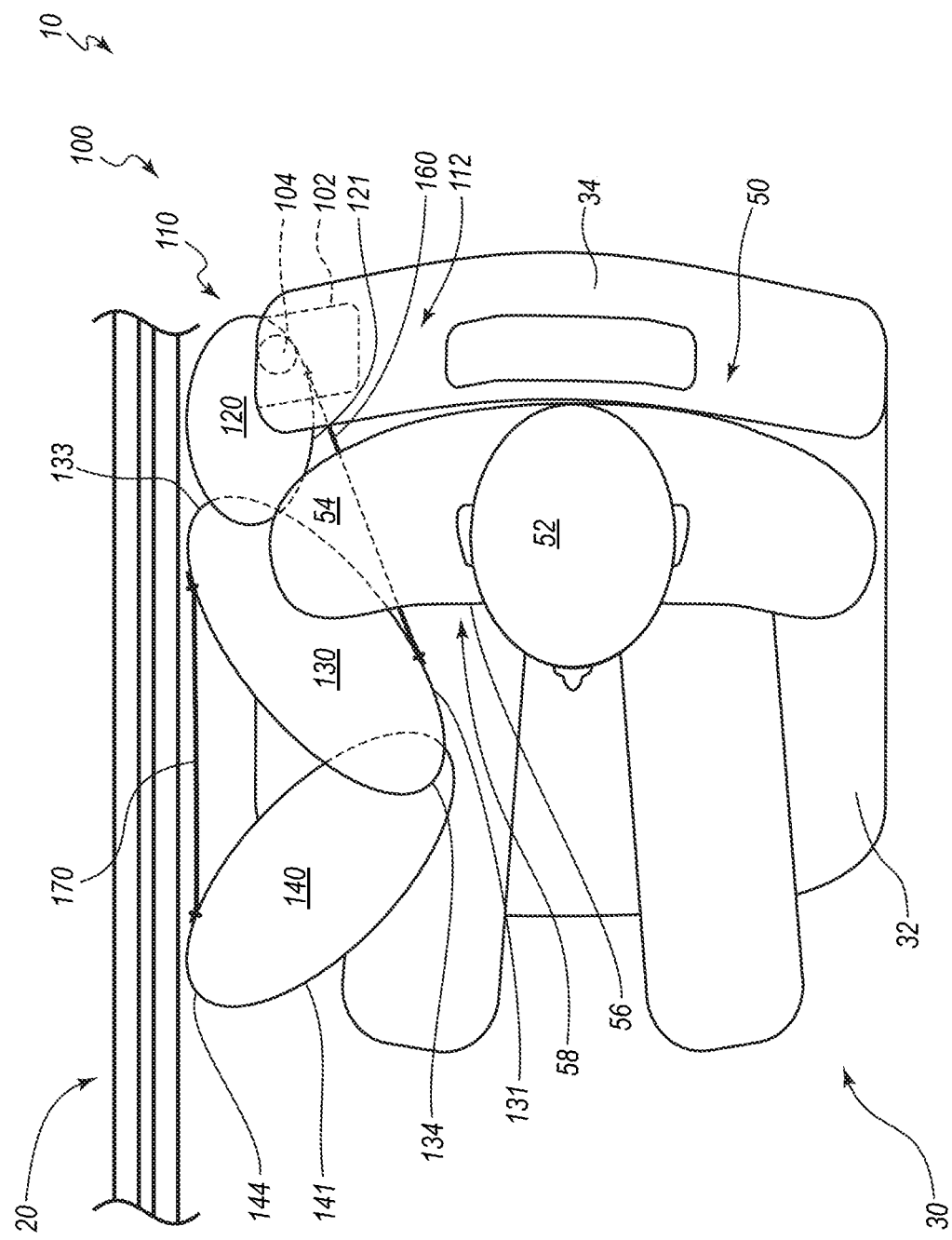
FIG. 2 is a top view of the airbag assembly of FIG. 1A in a deployed state.

FIG. 2 is top view of a portion of the interior of the vehicle 10 having the airbag assembly 100, with the side inflatable cushion 110 in a deployed state and at least partially inflated, and with the occupant 50 seated in an upright position in the vehicle occupant position 30. In the embodiment of FIG. 2, the airbag assembly 100 is installed to an outboard portion of the seat back 34. In another embodiment, the airbag assembly 100 may be installed to an adjacent structure, for example, a door post. In yet another embodiment, the airbag assembly 100 may be installed to an inboard portion of the seat back 34, or to another inboard structure, such as, e.g., a center console.

The side inflatable cushion 110 may have deployed from the housing 102 and may have been at least partially inflated by action of the inflator 104. The side inflatable cushion 110 is disposed such that at least a portion of the second inflatable chamber 130 and the third inflatable chamber 140 is over at least a portion of the seat 32 and forward of at least a portion of the vehicle occupant position 30. The proximal tether 160 and distal tether 170 may assist in disposing the second inflatable chamber 130 and third inflatable chamber 140 over at least a portion of the seat 32. The proximal tether 160 may couple at the first inflatable chamber 120 and second inflatable chamber 130 so as to draw the second inflatable chamber 130 over at least a portion of the seat 32 and forward of the vehicle occupant position 30. The distal tether 170 may couple at the second inflatable chamber 130 and the third inflatable chamber 140 so as to draw the distal end 144 of the third inflatable chamber 140 rearward, which, in turn, may push the distal end 134 of the second inflatable chamber 130 over at least a portion of the seat 32 so as to dispose the second inflatable chamber 130 over at least a portion of the seat 32 and forward of at least a portion of the vehicle occupant position 30.

The side inflatable cushion 110 may include a receiving zone 112. The receiving zone 112 can comprise at least a portion of an inboard panel 131 of the second inflatable chamber 130, and may include a portion of an inboard panel 121 of the first inflatable chamber 120 and a portion of an inboard panel 141 of the third inflatable chamber 140. In a frontal collision, a portion of the torso 56 of the occupant 50 may engage the receiving zone 112, in particular, the portion of the receiving zone 112 formed by the inboard panel 131 of the second inflatable chamber 130. In an oblique collision, a portion of the torso 56 and pelvic region 58 of the occupant 50 may engage the receiving zone 112, including the portion of the receiving zone 112 formed by the inboard panel 131 of the second inflatable chamber 130 and a portion of the inboard panel 141 of the third inflatable chamber 140 near the proximal end 133 of the second inflatable chamber 130. In a side impact event, a portion of the torso 56 and a portion of the pelvic region 58 of the occupant 50 may engage the receiving zone 112, including the portion of the receiving zone 112 formed by a portion of an inboard panel 121 of the first inflatable chamber 120 and at least a portion of the inboard panel 131 of the second inflatable chamber 130.

During a collision event, the proximal end 133 of the second inflatable chamber 130, and the distal end 144 of the third inflatable chamber 140 may engage the door 20 (or another structure) of the vehicle 10 to provide support to the side inflatable cushion 110 to receive and support at least a portion of the torso 56 and a portion of the pelvic region 58 of the occupant 50. The side inflatable cushion 110, when disposed over at least a portion of the seat 32 and at least partially forward of the vehicle occupant position 30, may provide primary protection to the occupant 50 from impact with side structures of the vehicle 10, such as, for example, the door 20, and may support and guide the occupant 50 moving from the vehicle occupant position 30 forward to engage another restraint, such as, for example, a dashboard-mounted inflatable cushion (not shown).

Figure 3:
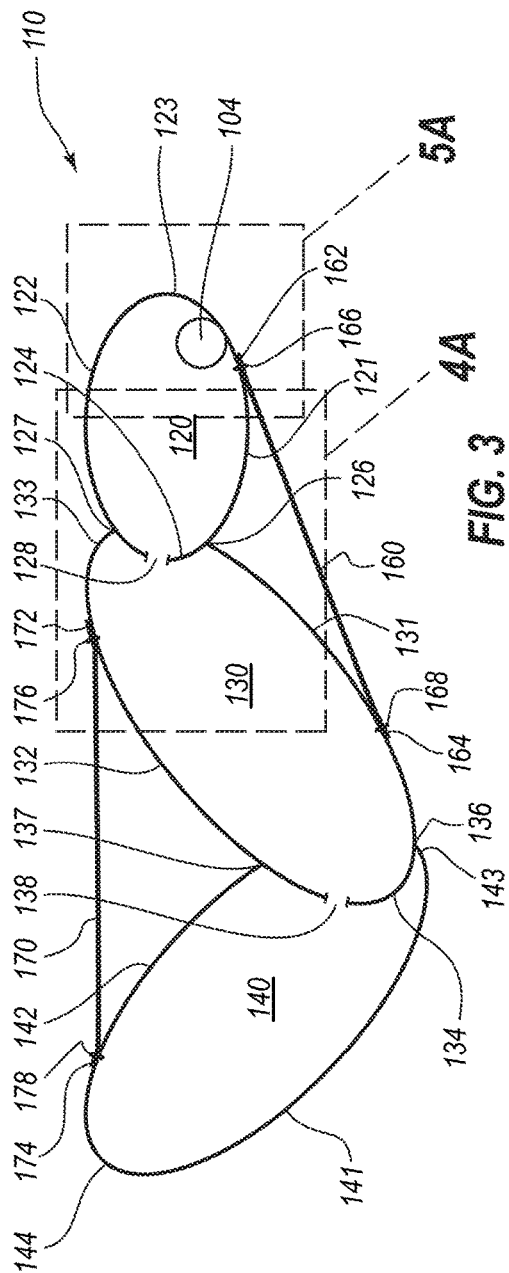
FIG. 3 is a top view of the side inflatable cushion and inflator of FIGS. 1A-2, with the side inflatable cushion deployed and at least partially inflated.

FIG. 3 is a top view of the side inflatable cushion 110 and the inflator 104, with the side inflatable cushion 110 deployed and at least partially inflated. Dashed line 4A indicates the position of the detail view shown in FIG. 4A (also in FIG. 4B). Dashed line 5A indicates the position of the detail view shown in FIG. 5A (also in FIGS. 5B and 5C).

The side inflatable cushion 110 can include the first inflatable chamber 120, the second inflatable chamber 130, and the third inflatable chamber 140, as well as the proximal positioning tether 160 and the distal positioning tether 170. The first inflatable chamber 120 can comprise at least an inboard panel 121 and an outboard panel 122. The first inflatable chamber 120 may be formed of a single, unitary panel comprising the inboard panel 121 and outboard panel 122, or by distinct panels 121, 122 coupled to each other by any appropriate means. The first inflatable chamber 120 may include a proximal end 123 and a distal end 124. In the embodiment of FIG. 3, the inflator 104 may be within, or partially within, the first inflatable chamber 120 and near the proximal end 123 of the first inflatable chamber 120. The first inflatable chamber 120 and second inflatable chamber 130 may couple to each other near the distal end 124 of the first inflatable chamber 120. In other words, the inboard panel 121 of the first inflatable chamber 120 may couple to the second inflatable chamber 130 at a proximo-medial inboard coupling 126, and the outboard panel 122 of the first inflatable chamber 120 may couple to the second inflatable chamber 130 at a proximo-medial outboard coupling 127. The first inflatable chamber 120 may include an aperture 128 at or near the distal end 124 of the first inflatable chamber 120, and between the proximo-medial inboard coupling 126 and the proximo-medial outboard coupling 127. The aperture 128 may be a simple opening, or a valve of any appropriate type to permit fluid communication of inflation gas from the first inflatable chamber 120 to the second inflatable chamber 130.

The second inflatable chamber 130 may be formed of a single, unitary panel comprising the inboard panel 131 and outboard panel 132, or by distinct panels 131, 132 coupled to each other by any appropriate means. The second inflatable chamber 130 may include a proximal end 133 and a distal end 134. The second inflatable chamber 130 and third inflatable chamber 140 may couple to each other near the distal end 134 of the second inflatable chamber 130. In other words, the inboard panel 131 of the second inflatable chamber 130 may couple to the third inflatable chamber 140 at a disto-medial inboard coupling 136, and the outboard panel 132 of the second inflatable chamber 130 may couple to the third inflatable chamber 140 at a disto-medial outboard coupling 137. The second inflatable chamber 130 may include an aperture 138 at or near the distal end 134 of the second inflatable chamber 130, and between the disto-medial inboard coupling 136 and the disto-medial outboard coupling 137. The aperture 138 may be a simple opening, or a valve of any appropriate type to permit fluid communication of inflation gas from the second inflatable chamber 130 to the third inflatable chamber 140.

The third inflatable chamber 140 may be formed of a single, unitary panel comprising the inboard panel 141 and outboard panel 142, or by distinct panels 141, 142 coupled to each other by any appropriate means. The third inflatable chamber 140 may include a proximal end 143 and a distal end 144.

The apertures 128 and 138 may permit fluid communication of inflation gas bi-directionally without limitation, or may include valves which limit or restrict the flow of inflation gas to assist in proper deployment and inflation of the side inflatable cushion 110 and to further assist with supporting the occupant (not shown, but see, e.g., 50 in FIG. 2) during ride down. The apertures 128, 138 may include valves which restrict the communication of inflation gas distally from the inflator 104 until the proximal inflatable chamber(s) 120, 130 attain(s) a target inflation pressure. In other words, the aperture 128 may include a valve which restricts the communication of inflation gas from the first inflatable chamber 120 to the second inflatable chamber 130 until the first inflatable chamber 120 attains a target inflation pressure, and the aperture 138 may likewise include a valve which restricts the communication of inflation gas from the second inflatable chamber 130 to the third inflatable chamber 140 until the second inflatable chamber 130 attains a target inflation pressure. The apertures 128, 138 may include valves which prevent communication of inflation gas from the distal inflatable chamber 140, 130 to the proximal inflatable chamber 130, 120. In other words, the aperture 138 may include a valve which prevents inflation gas from back-flowing from the third inflatable chamber 140 to the second inflatable chamber 130, and the aperture 128 may include a valve which prevents inflation gas from back-flowing from the second inflatable chamber 130 to the first inflatable chamber 120.

The proximal positioning tether 160 may include a first end (hereafter, proximal end) 162 and a second end (hereafter, distal end) 164. The proximal end 162 of the proximal positioning tether 160 may couple at a proximal coupling 166 to a proximal portion of the inboard panel 121 of the first inflatable chamber 120, and the distal end 164 of the proximal positioning tether 160 may couple at a distal coupling 168 to a distal portion of the inboard panel 131 of the second inflatable chamber 130. The coupling of the proximal positioning tether 160 at the proximal coupling 166 to the first inflatable chamber 120 and at the distal coupling 168 to the second inflatable chamber 130 may assist in drawing the distal end 134 of the second inflatable chamber 130 rearward relative to the vehicle 10 and inward over at least a portion of the seat (not shown, but see, e.g., 32 in FIG. 2) and at least partially in front of the vehicle occupant position (see 30 in FIG. 2).

The distal positioning tether 170 may include a first end (hereafter, proximal end) 172 and a second end (hereafter, distal end) 174. As shown in FIG. 3, the proximal end 172 of the distal positioning tether 170 may couple at a proximal coupling 176 to a proximal portion of the outboard panel 132 of the second inflatable chamber 130, and the distal end 174 of the distal positioning tether 170 may couple at a distal coupling 178 to a distal portion of the outboard panel 142 of the third inflatable chamber 140. The coupling of the distal positioning tether 170 at the proximal coupling 176 to the second inflatable chamber 130 and at the distal coupling 178 to the third inflatable chamber 140 may assist in drawing the distal end 144 of the third inflatable chamber 140 rearward relative to the vehicle 10 and outward. The distal end 144 of the third inflatable chamber 140 may engage a reaction surface such as, for example, the door (see 20 in FIG. 2). The coupling of the second inflatable chamber 130 to the third inflatable chamber 140 at disto-medial inboard and outboard couplings 136, 137, along with the disposition of the distal positioning tether 170, may assist in positioning the distal end 134 of the second inflatable chamber 130 (as well as the proximal end 143 of the third inflatable chamber 140) over at least a portion of the seat (see 32 in FIG. 2) and at least partially in front of the vehicle occupant position (see 30 in FIG. 2). In other words (with reference to FIG. 2), the second inflatable chamber 130, the third inflatable chamber 140, and the distal tether 170 may be coupled so as to form a triangle when deployed and at least partially inflated, with the base of the triangle nominally supported by a reaction surface such as, for example, the door 20 or other outboard structure(s) of the vehicle 10, and the apex of the triangle disposed over at least a portion of the seat 32 and at least partially in front of the vehicle occupant position 30. In an embodiment in which the airbag assembly 100 is mounted to an inboard portion of the seat back 34 (or to another inboard structure of the vehicle 10), the base of the triangle may be supported by a vehicle structure or structures inboard of the vehicle occupant position 30 (e.g., a center console) with the apex of the triangle disposed over at least a portion of the seat 32 and at least partially in front of the vehicle occupant position 30.

Figure 4B:
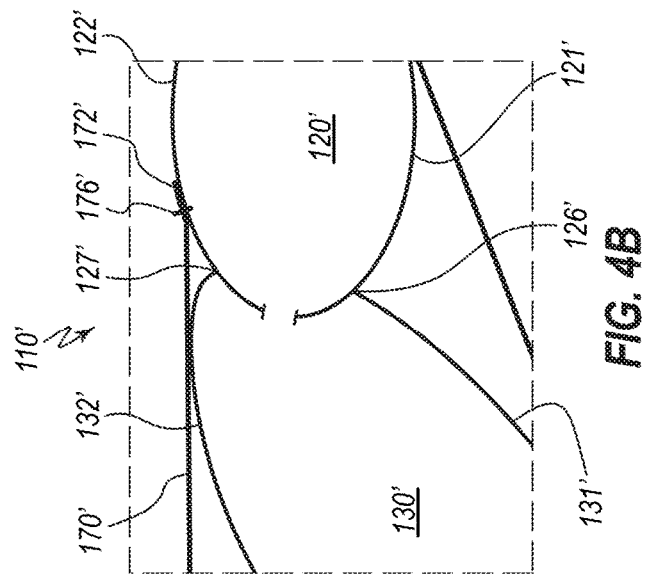
FIG. 4B is a detail view of a portion of another embodiment of a side inflatable cushion, similar to that illustrated in FIG. 4A.
Figure 4A:
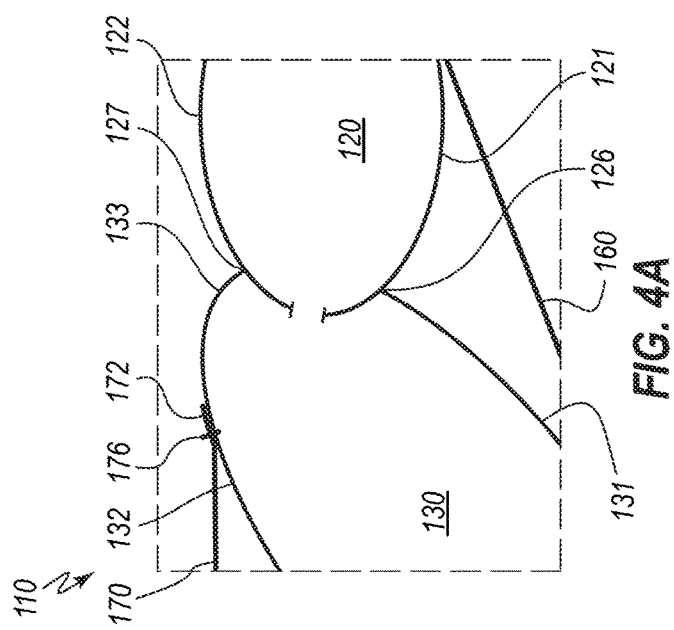
FIG. 4A is a detail view of a portion of the side inflatable cushion of FIG. 3 taken through line 4A.

FIG. 4A is a detail view of an embodiment of the side inflatable cushion 110, with the side inflatable cushion 110 deployed and at least partially inflated and having the distal tether 170 coupled to the second inflatable chamber 130. The first inflatable chamber 120 and the second inflatable chamber 130 are shown, including the inboard and outboard panels 121, 122 of the first inflatable chamber 120, and the inboard and outboard panels 131, 132 of the second inflatable chamber 130 for reference. The proximo-medial inboard coupling 126 and the proximo-medial outboard coupling 127 are also shown for reference. In FIG. 4A, the proximal end 172 of the distal tether 170 may couple at a proximal coupling 176 to a proximal portion of the second inflatable chamber 130.

FIG. 4B is a detail view of another embodiment of a side inflatable cushion 110' with the side inflatable cushion 110' deployed and at least partially inflated and having a distal tether 170' coupled to a first inflatable chamber 120'. The first inflatable chamber 120' and a second inflatable chamber 130' are shown, including inboard and outboard panels 121', 122' of the first inflatable chamber 120', and inboard and outboard panels 131', 132' of the second inflatable chamber 130'. A proximo-medial inboard coupling 126' and a proximo-medial outboard coupling 127' are also shown for reference. In FIG. 4B, a proximal end 172' of the distal tether 170' may couple at a proximal coupling 176' to a distal portion of the first inflatable chamber 120'. The location of the proximal couplings 176, 176' of the distal tethers 170, 170' in the embodiments of FIG. 4A or 4B may serve to support the disposition and configuration of the side inflatable cushion 110, 110', respectively.

FIG. 5A is a detail view of an embodiment of the side inflatable cushion 110 having the proximal tether 160 coupled to the first inflatable chamber 120. The inflator 104 is shown for reference. In the embodiment of FIG. 5A, the proximal tether 160 couples at the proximal coupling 166 to a proximal portion of the inboard panel 121 of the first inflatable chamber 120. The proximal coupling 166 may be a seam formed in any appropriate manner. In another embodiment, the proximal tether 160 may be coupled at the proximal coupling 166 to a proximal portion of the outboard panel (see 122 in FIG. 3) of the first inflatable chamber 120. In other words, in at least one embodiment, the side inflatable cushion 110 may be flipped laterally (mirrored) such that the second inflatable chamber (130 in FIG. 3) is oriented with the distal end 134 configured to rest toward or against a reaction surface, such as a door or a center console.

FIG. 5B is a detail view of another portion of the side inflatable cushion 110' with the side inflatable cushion 110' deployed and at least partially inflated, and having a proximal tether 160' coupled to an inflator 104'. The first inflatable chamber 120' is shown for reference. In the embodiment of FIG. 5B, the proximal tether 160' couples at a proximal coupling 166' to the inflator 104' (e.g., to an inflator stud). The proximal coupling 166' may be any appropriate fabric-to-hardware manner of coupling. In another embodiment, the proximal tether 160' may be coupled at the proximal coupling 166' to a proximal portion of the outboard panel (see 122 in FIG. 3) of the first inflatable chamber 120'. In other words, in at least one embodiment, the side inflatable cushion 110' may be flipped laterally (mirrored) such that the second inflatable chamber (130 in FIG. 3) is oriented with the distal end 134 configured to rest toward or against a reaction surface, such as a door or a center console.

FIG. 5C is a detail view of another embodiment of a side inflatable cushion 110" with the side inflatable cushion 110" deployed and at least partially inflated, and having a proximal tether 160" coupled at a housing 102". An inflator 104" and a first inflatable chamber 120" are shown for reference. In the embodiment of FIG. 5C, the proximal tether 160" couples at a proximal coupling 166" to the housing 102" (e.g., to an attachment bracket coupled to the housing 102"). The proximal coupling 166" may be formed in any suitable manner for coupling to the housing 102". In another embodiment, the proximal tether 160" may be coupled at the proximal coupling 166" to a proximal portion of the outboard panel (see 122 in FIG. 3) of the first inflatable chamber 120". In other words, in at least one embodiment, the side inflatable cushion 110" may be flipped laterally (mirrored) such that the second inflatable chamber (130 in FIG. 3) is oriented with the distal end 134 configured to rest toward or against a reaction surface, such as a door or a center console.

FIG. 6 is a side view of the side inflatable cushion 110 with the side inflatable cushion 110 deployed and at least partially inflated. In the embodiment of FIG. 6, the height of the first inflatable chamber 120 is the same as the height of the second inflatable chamber 130 and of the third inflatable chamber 140. In other embodiments, the inflatable chambers 120, 130, 140 may be of different heights, as described elsewhere herein. The inflator 104 is shown for reference.

The proximal positioning tether 160 couples at the proximal coupling 166 to the inboard panel 121 of the first inflatable chamber 120, and at the distal coupling 168 to the inboard panel 131 of the second inflatable chamber 130. The distal positioning tether 170 couples at the proximal coupling 176 to the outboard panel 132 of the second inflatable chamber 130 and at the distal coupling 178 to the outboard panel 142 of the third inflatable chamber 140.

FIG. 7A depicts an embodiment of an airbag assembly that resembles the airbag assembly 100 described above in certain respects. Accordingly, like features are designated with like reference numerals, with the leading digits incremented to "7." For example, the embodiment depicted in FIG. 7A includes an airbag cushion 710 that may, in some respects, resemble the airbag cushion 110 of FIGS. 1A-3. Relevant disclosure set forth above regarding similarly identified features thus may not be repeated hereafter. Moreover, specific features of the airbag assembly 100 and related components shown in FIGS. 1A-3 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag system and related components depicted in FIG. 7A. Any suitable combination of the features, and variations of the same, described with respect to the airbag assembly 100 and related components illustrated in FIGS. 1A-3 can be employed with the airbag assembly and related components of FIG. 7A, and vice versa. This pattern of disclosure applies equally to further embodiments depicted in subsequent figures and described hereafter, wherein the leading digits may be further incremented.

FIG. 7A is a top view of another embodiment of a side inflatable cushion 710, wherein the side inflatable cushion 710 is deployed and at least partially inflated. An inflator 704, a first inflatable chamber 720, a second inflatable chamber 730, and a third inflatable chamber 740 are shown for reference. The first inflatable chamber 720 can include an inboard panel 721 and an outboard panel (not shown, but see, e.g., 722 in FIG. 7B). The second inflatable chamber 730 can include an inboard panel 731 and an outboard panel 732. The third inflatable chamber 740 can include an inboard panel (see 741 in FIG. 7B) and an outboard panel 742.

In the embodiment of FIG. 7A, a plurality of proximal positioning tethers 760a, 760b couple at a proximal portion of the inboard panel 721 of the first inflatable chamber 720, and at a distal portion of the inboard panel 731 of the second inflatable chamber 730. The upper proximal positioning tether 760a couples at an upper proximal coupling 766a to a proximal portion of the inboard panel 721 of the first inflatable chamber 720, and at an upper distal coupling 768a to a distal portion of the inboard panel 731 of the second inflatable chamber 730. The lower proximal positioning tether 760b couples at a lower proximal coupling 766b to a proximal portion of the inboard panel 721 of the first inflatable chamber 720, and at a lower distal coupling 768b to a distal portion of the inboard panel 731 of the second inflatable chamber 730. While the embodiment of FIG. 7A illustrates two proximal positioning tethers 760a, 760b, other embodiments otherwise similar to that of FIG. 7A may include more than two proximal positioning tethers 760a, 760b.

In the embodiment of FIG. 7A, a plurality of distal positioning tethers 770a, 770b couple at a proximal portion of the outboard panel 732 of the second inflatable chamber 730, and at a distal portion of the outboard panel 742 of the third inflatable chamber 740. The upper distal positioning tether 770a couples at an upper proximal coupling 776a to a proximal portion of the outboard panel 732 of the second inflatable chamber 730, and at an upper distal coupling 778a to a distal portion of the outboard panel 742 of the third inflatable chamber 740. The lower distal positioning tether 770b couples at a lower proximal coupling 776b to a proximal portion of the outboard panel 732 of the second inflatable chamber 730, and at a lower distal coupling 778b to a distal portion of the outboard panel 742 of the third inflatable chamber 740. While the embodiment of FIG. 7A illustrates two distal positioning tethers 770a, 770b, other embodiments otherwise similar to that of FIG. 7A may include more than two distal positioning tethers 770a, 770b.

In some embodiments, a single proximal positioning tether 760 may be used with a plurality of distal positioning tethers 770a, 770b, etc. In yet other embodiments, a plurality of proximal tethers 760a, 760b, etc., may be used with a single distal positioning tether 770.

FIG. 7B is a side view of the side inflatable cushion 710 with the side inflatable cushion 710 deployed and at least partially inflated. The inflator 704, the first inflatable chamber 720, second inflatable chamber 730, and third inflatable chamber 740 are shown for reference. The inboard panel 721 and outboard panel 722 of the first inflatable chamber 720, the inboard panel 731 and outboard panel 732 of the second inflatable chamber 730, and the inboard panel 741 and outboard panel 742 of the third inflatable chamber 740 are also shown for reference. In the embodiment of FIG. 7B, the upper proximal positioning tether 760a, upper proximal coupling 766a, and upper distal coupling 768a, as well as the upper distal positioning tether 770a, upper proximal coupling 776a, and upper distal coupling 778a are shown near the upper extent of the side inflatable cushion 710. In another embodiment, the upper proximal positioning tether 760a and its couplings 766a, 768a, and the upper distal positioning tether 770a and its couplings 776a, 778a may be somewhat further from the upper extent of the side inflatable cushion 710. Similarly, the lower proximal positioning tether 760b, lower proximal coupling 766b, and lower distal coupling 768b, as well as the lower distal positioning tether 770b, lower proximal coupling 776b, and lower distal coupling 778b are shown near the lower extent of the inflatable side cushion 710. In another embodiment, the lower proximal positioning tether 760b and its couplings 766b, 768b, and the lower distal positioning tether 770b and its couplings 776b, 778b may be somewhat further from the lower extent of the side inflatable cushion 710.

Figure 8A:
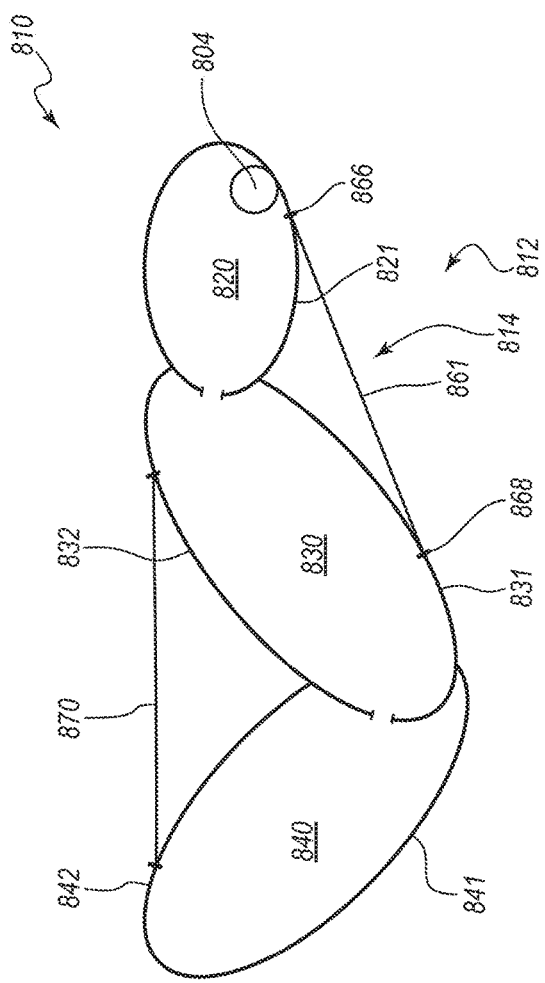
FIG. 8A is a top view of a side inflatable cushion, according to another embodiment of the present disclosure, in a deployed state.

FIG. 8A is a top view of a side inflatable cushion 810 with the side inflatable cushion 810 deployed and at least partially inflated. An inflator 804, a first inflatable chamber 820, a second inflatable chamber 830, and a third inflatable chamber 840 are shown for reference. A distal positioning tether 870 is also shown for reference. The distal positioning tether 870 couples to an outboard panel 832 of the second inflatable chamber 830 and to an outboard panel 842 of the third inflatable chamber 840. A proximal positioning panel 861 couples at a proximal coupling 866 to a proximal portion of an inboard panel 821 of the first inflatable chamber 820, and at a distal coupling 868 to an inboard panel 831 of the second inflatable chamber 830.

Figure 8B:
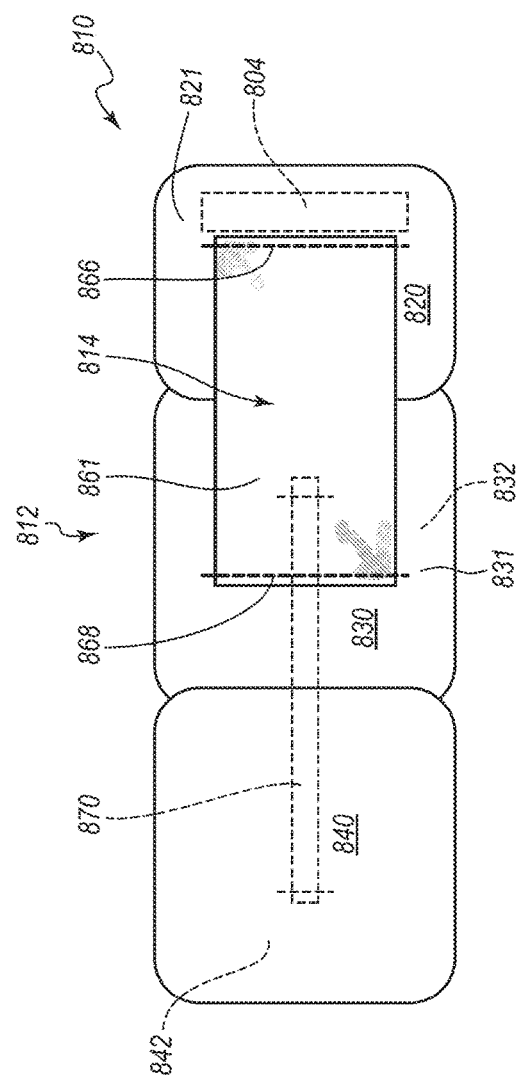
FIG. 8B is a side view of the side inflatable cushion of FIG. 8A in a deployed state.

FIG. 8B is a side view of the side inflatable cushion 810 with the side inflatable cushion 810 deployed and at least partially inflated. The inflator 804, first inflatable chamber 820, second inflatable chamber 830, and third inflatable chamber 840 are shown for reference. The distal positioning tether 870, which couples to the outboard panel 832 of the second inflatable chamber 830 and the outboard panel 842 of the third inflatable chamber 840, is also shown for reference. The proximal positioning panel 861 couples at the proximal coupling 866 to the inboard panel 821 of the first inflatable chamber 820, and at the distal coupling 868 to the inboard panel 831 of the second inflatable chamber 830.

The embodiment of FIGS. 8A and 8B can include a receiving zone 812 and a first receiving zone 814. The receiving zone 812 can comprise at least a portion of the inboard panel 831 of the second inflatable chamber 830, and may include a portion of the inboard panel 821 of the first inflatable chamber 820 and a portion of the inboard panel 841 of the third inflatable chamber 840. The first receiving zone 814 is positioned on an inboard surface of the proximal positioning panel 861. In other words, at least a portion of the inboard face of the proximal positioning panel 861 may function as a first receiving zone 814 to receive a portion of the pelvis 58 and/or the torso 56 of the occupant 50 (see FIG. 1) during a collision event. The first receiving zone 814 may augment or assist the receiving zone 812. The disposition of the first receiving zone 814 may permit the occupant 50 to engage the first receiving zone 814 before the occupant 50 engages the receiving zone 812. With the first receiving zone 814 positioned on the inboard face of the proximal positioning panel 861, and with the proximal positioning panel 861 coupled to the inboard panels 821, 831 of the first and second inflatable chambers 820, 830, the energies of the occupant 50 engaging the first receiving zone 814 may cause the second inflatable chamber 830 to be drawn somewhat more rearward and inward in front of a vehicle occupant position (see 30 in FIG. 1B) such that the receiving zone 812 may be reactively disposed to receive at least a portion of the pelvis 58 and/or torso 56.

FIG. 9A is a top view of a side inflatable cushion 910 with the side inflatable cushion 910 deployed and at least partially inflatable. The inflator 904, first inflatable chamber 920, second inflatable chamber 930, and third inflatable chamber 940 are shown for reference. The distal positioning tether 970 is also shown for reference, and couples to the outboard panel 932 of the second inflatable chamber 930 and the outboard panel 942 of the third inflatable chamber 940.

In FIG. 9A, a proximal positioning panel 963 couples to the inboard panel 921 of the first inflatable chamber 920 and to the inboard panel 931 of the second inflatable chamber at a perimeter coupling 969. A first receiving zone 914 may be positioned on an inboard surface of the proximal positioning panel 963.

FIG. 9B is a side view of the side inflatable cushion 910 with the side inflatable cushion 910 deployed and at least partially inflated. The inflator 904, first inflatable chamber 920, second inflatable chamber 930, and third inflatable chamber 940 are shown for reference, as are the distal positioning tether 970, the inboard panel 921 of the first inflatable chamber 920, the inboard and outboard panels 931, 932 of the second inflatable chamber 930, and the outboard panel 942 of the third inflatable chamber 940. The proximal positioning panel 963 couples about a perimeter coupling 969 to the inboard panel 921 of the first inflatable chamber 920, and to the inboard panel 931 of the second inflatable chamber 930.

In some embodiments, panels that are substantially triangular shaped (not shown) may be attached in the x-y plane of FIG. 9B, for example, a first panel along an upper edge and a second panel along a lower edge of the inflatable chambers. Such panels may function in a manner similar to tethers, as discussed above, that are disposed in the x-z plane of FIG. 9B to position the side inflatable cushion.

The combination of the proximal positioning panel 963 and distal positioning tether 970 may dispose the first receiving zone 914 and a receiving zone 912 so as to receive at least a portion of the pelvis 58 and/or torso 56 of the occupant 50 during a vehicle impact event (see FIG. 1B).

FIGS. 8A-8B and 9A-9B illustrate embodiments of the disclosures herein which combine, in FIGS. 8A-8B, a rectangular proximal positioning panel 861 and a distal positioning tether 870; and, in FIGS. 9A-9B, a roughly diamond-shaped proximal positioning panel 963 and a distal positioning tether 970. Other embodiments may use different combinations of panels and tethers. For example, an embodiment may employ a rectangular positioning panel similar to 861 in FIGS. 8A-8B, or a diamond-shaped positioning panel similar to 963 in FIGS. 9A-9B in lieu of the distal positioning tether 870, 970. In yet another embodiment, a distal positioning panel similar to 861 in FIGS. 8A-8B or 963 in FIGS. 9A-9B may be combined with one or more proximal positioning tether(s) similar to 160 in FIG. 3. Yet other combinations of positioning tethers and panels are anticipated by this disclosure. Yet other embodiments may omit the proximal positioning tether(s) 160/proximal positioning panel 861/963 and include one or more distal positioning tether(s) similar to 870/970 or a distal positioning panel similar to the proximal positioning panel 861 or 963.

FIGS. 10A-10F are side views of embodiments of airbag assemblies 1000a-1000f illustrating differing heights of first, second, and third inflatable chambers 1020a-1020f, 1030a-1030f, 1040a-1040f of side inflatable cushions 1010a-1010f, respectively. In FIGS. 10A-10F, the side inflatable cushions 1010a-1010f are illustrated deployed and at least partially inflated. The side inflatable cushions 1010a-1010f in each of FIGS. 10A-10F can include at least the first inflatable chamber 1020a-1020f, the second inflatable chamber 1030a-1030f, and the third inflatable chamber 1040a-1040a, respectively. In FIGS. 10A-10F, the vehicle occupant position 30, the seat 32, the seat back 34, inflators 1004a-1004f, and distal positioning tethers 1070a-1070f, respectively, are shown for reference. FIGS. 10A-10F illustrate airbag assemblies 1000a-1000f installed to an inboard portion of the seat back 34. The embodiments in FIGS. 10A-10F of the airbag assemblies 1000a-1000f may be suitable for installation to either side of the seat back 34, or to an adjacent vehicle structure such as, for example, a door, a door post, or a center console.

FIG. 10A is a side view of an airbag assembly 1000a with a side inflatable cushion 1010a deployed and at least partially inflated and having a first, second, and third inflatable chamber 1020a, 1030a, 1040a each having substantially the same height. In the embodiment of FIG. 10A, heights of the first, second, and third inflatable chambers 1020a, 1030a, 1040a are substantially equal. The second inflatable chamber 1030a is configured to receive at least a portion of the torso 56 of the occupant 50 (see FIGS. 1B-1C) moving primarily in the forward direction relative to the vehicle during a vehicle impact event. The substantially equal heights of the first, second, and third inflatable chambers 1020a, 1030a, 1040a may configure the side inflatable cushion 1010a to receive and support, or receive and guide to another supplemental restraint (e.g., a frontal airbag) at least a portion of the pelvis 58 and/or torso 56 of the occupant 50, more particularly, in an oblique vehicle impact event. The configuration of FIG. 10A may be more suitable in some vehicle configurations than in other vehicle configurations.

FIG. 10B is a side view of an airbag assembly 1000b with a first inflatable chamber 1020b having a different height relative to the second and third inflatable chambers 1030b, 1040b. In the embodiment of FIG. 10B, the height of the first inflatable chamber 1020b is greater than the heights of the second and third inflatable chambers 1030b, 1040b. The height of the first inflatable chamber 1020b may assist the first inflatable chamber 1020b to engage at least a portion of the pelvis 58 and torso 56 of the occupant 50, while the heights of the second and third inflatable chambers 1030b, 1040b may assist the second and third inflatable chambers 1030b, 1040b to engage at least a portion of the pelvis 58 of the occupant 50 in a vehicle impact event. The height of the second and third inflatable chambers 1030b, 1040b may, more particularly, engage the pelvis 58 of the occupant 50 in an oblique vehicle impact event. The configuration of FIG. 10B may be more suitable in some vehicle configurations than in other vehicle configurations.

FIG. 10C is a side view of an airbag assembly 1000c with the height of first, second, and third inflatable chambers 1020c, 1030c, 1040c greater than in FIG. 10B. In the embodiment of FIG. 10C, the height of the first inflatable chamber 1020c is greater than the heights of the second and third inflatable chambers 1030c, 1040c. The height of the first inflatable chamber 1020c may assist the first inflatable chamber 1020c to engage at least a portion of the pelvis 58, the torso 56, and the shoulders 54 of the occupant 50, while the height of the second and third inflatable chambers 1030c, 1040c may assist the second and third inflatable chambers 1030c, 1040c to engage at least a portion of the pelvis 58 and torso 56 of the occupant 50 during, more particularly, an oblique vehicle impact event. The configuration of FIG. 10C may be more suitable in some vehicle configurations than in other vehicle configurations.

FIG. 10D is a side view of an airbag assembly 1000d with the height of a first inflatable chamber 1020d similar to the height of the first inflatable chamber 1020c in FIG. 10C, and the heights of second and third inflatable chambers 1030d, 1040d similar to the heights of the second and third inflatable chambers 1030b, 1040b of FIG. 10B. The height of the first inflatable chamber 1020d may assist the first inflatable chamber 1020d to engage at least a portion of the pelvis 58, the torso 56, and the shoulders 54 of the occupant 50, while the height of the second and third inflatable chambers 1030d, 1040d may assist the second and third inflatable chambers 1030d, 1040d to engage at least a portion of the pelvis 58 of the occupant 50 during, more particularly, an oblique vehicle impact event. The configuration of FIG. 10D may be more suitable in some vehicle configurations than in other vehicle configurations.

FIG. 10E is a side view of an airbag assembly 1000e with the height of a first inflatable chamber 1020e greater than the height of a second inflatable chamber 1030e, and the height of the second inflatable chamber 1030e greater than the height of a third inflatable chamber 1040e. The height of the first inflatable chamber 1020e may assist the first inflatable chamber 1020e to engage at least a portion of the pelvis 58, torso 56, and shoulder 54 of the occupant 50 during a vehicle impact event. The height of the second inflatable chamber 1030e may assist the second inflatable chamber 1030e to engage at least a portion of the pelvis 58 and torso 56 of the occupant 50. The height of the third inflatable chamber 1040e may assist the third inflatable chamber 1040e to engage at least a portion of the pelvis 58 of the occupant 50. The configuration of FIG. 10E may be more suitable in some vehicle configurations than in other vehicle configurations.

FIG. 10F is a side view of an airbag assembly 1000f with the height of a first inflatable chamber 1020f greater than the height of the first inflatable chamber 1020e in FIG. 10E. The height of the first inflatable chamber 1020f may assist the first inflatable chamber 1020f to engage at least a portion of the pelvis 58, torso 56, shoulders 54 and head 52 (see FIG. 1C) of the occupant 50 during a vehicle impact event. The height of a second inflatable chamber 1030f may assist the second inflatable chamber 1030f to engage at least a portion of the pelvis 58 and torso 56 of the occupant 50. The height of a third inflatable chamber 1040f may assist the third inflatable chamber 1040f to engage at least a portion of the pelvis 58 of the occupant 50. The configuration of FIG. 10F may be more suitable in some vehicle configurations than in other vehicle configurations.

FIGS. 11A-11H are top views of side inflatable cushions 1110a-1110h with the side inflatable cushions 1110a-1110h deployed and at least partially inflated, and having varying configurations of inflatable chambers, positioning tethers, and/or panels as discussed below. Inflators 1104a-1104h are shown in FIGS. 11A-11H for reference. In FIGS. 11A-11H, the side inflatable cushions 1110a-1110h can comprise two or more inflatable chambers. In FIGS. 11A-11H, the side inflatable cushions 1110a-1110h are shown deployed and at least partially inflated as from an installation to an inboard side of the seat back 34 of FIGS. 1A-1C. The embodiments in FIGS. 11A-11H of the airbag assemblies may be suitable for installation to either side of the seat back 34, or to an adjacent vehicle structure such as, for example, a door, a door post, or a center console. The embodiments of FIGS. 11A-11H may incorporate any of the chamber height configurations described in FIGS. 10A-10F. For this reason, the description of each FIG. 11A-11H notes that an embodiment may assist at least one inflatable chamber to engage at least a portion of the pelvis 58 of the occupant. Combining any configuration of FIGS. 11A-11H with any of the various chamber height configurations of FIGS. 10A-10F, a particular configuration may assist at least one inflatable chamber to engage at least a portion of the pelvis 58, the torso, 56, the shoulders 54, and/or the head 52 of the occupant 50.

Figure 11B:
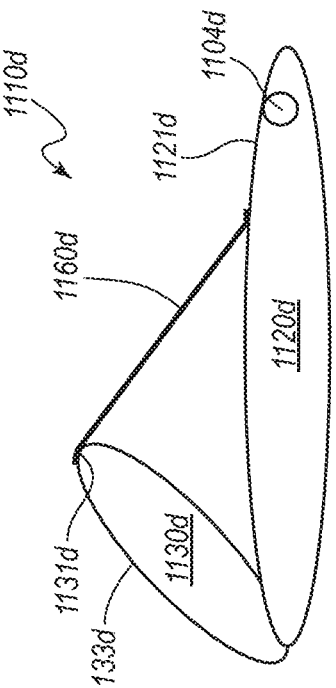
FIG. 11B is a top view of a side inflatable cushion, according to another embodiment of the present disclosure, in a deployed state.
Figure 11D:
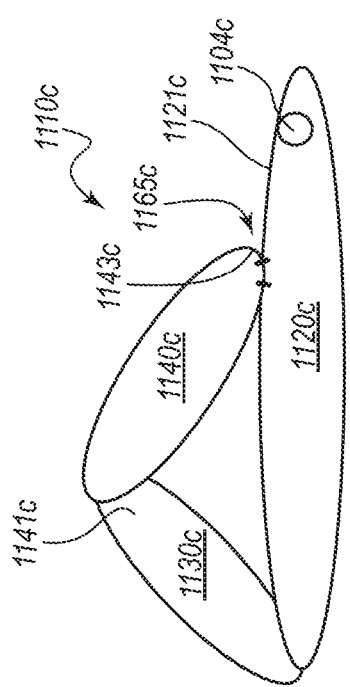
FIG. 11D is a top view of a side inflatable cushion, according to another embodiment of the present disclosure, in a deployed state.
Figure 11A:
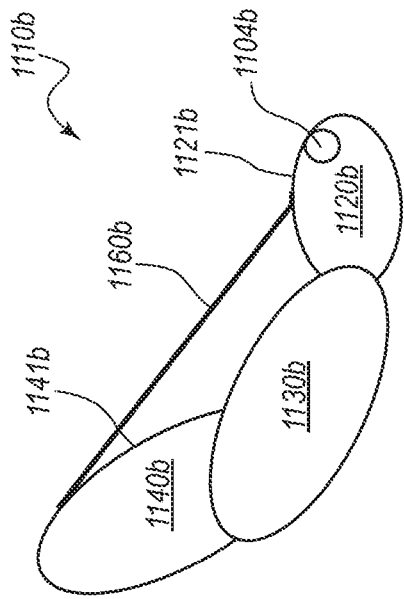
FIG. 11A is a top view of a side inflatable cushion, according to another embodiment of the present disclosure, in a deployed state.

FIG. 11A is a top view of a side inflatable cushion 1110a having two inflatable chambers 1120a, 1130a and a single positioning tether 1160a. In the embodiment of FIG. 11A, the side inflatable cushion 1110a can include a first inflatable chamber 1120a, a second inflatable chamber 1130a, and the positioning tether 1160a. The first inflatable chamber 1120a couples to a housing (not shown, but see, e.g., 102 in FIG. 2). The second inflatable chamber 1130a couples to the first inflatable chamber 1120a. The positioning tether 1160a couples to a proximal portion of an inboard panel 1121a of the first inflatable chamber 1120a, and to a distal portion of an inboard panel 1131a of the second inflatable chamber 1130a. The positioning tether 1160a may draw the second inflatable chamber 1130a rearward and inward to dispose the second inflatable chamber 1130a to engage at least a portion of the pelvis 58 of the occupant 50. In another embodiment, the positioning tether 1160a may be supplanted by a positioning panel similar to the positioning panel 861 in FIGS. 8A-8B, or similar to the positioning panel 963 in FIGS. 9A-9B.

FIG. 11B is a top view of a side inflatable cushion 1110b having three inflatable chambers 1120b, 1130b, 1140b and a single positioning tether 1160b. In the embodiment of FIG. 11B, the side inflatable cushion 1110b can include a first inflatable chamber 1120b, a second inflatable chamber 1130b, a third inflatable chamber 1140b, and the positioning tether 1160b. The first inflatable chamber 1120b couples to the housing (not shown). The second inflatable chamber 1130b couples to the first inflatable chamber 1120b. The third inflatable chamber 1140b couples to the second inflatable chamber 1130b. The positioning tether 1160b couples to a proximal portion of the inboard panel 1121b of the first inflatable chamber 1120b and to a distal portion of an inboard panel 1141b of the third inflatable chamber 1140b. The positioning tether 1160b may draw the second and third inflatable chambers 1130b, 1140b rearward and inward to dispose the second and third inflatable chambers 1130b, 1140b to engage at least a portion of the pelvis 58 of the occupant 50. In another embodiment, the positioning tether 1160b may be supplanted by a positioning panel similar to the positioning panel 861 in FIGS. 8A-8B, or similar to the positioning panel 963 in FIGS. 9A-9B.

Figure 11C:
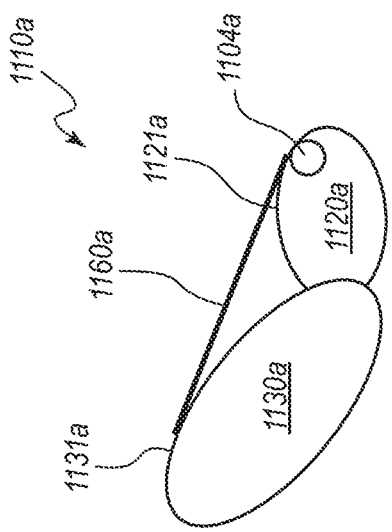
FIG. 11C is a top view of a side inflatable cushion, according to another embodiment of the present disclosure, in a deployed state.

FIG. 11C is a top view of a side inflatable cushion 1110c having three inflatable chambers 1120c, 1130c, 1140c and a positioning coupling 1165c. In the embodiment of FIG. 11C, the side inflatable cushion 1110c can include a first inflatable chamber 1120c, a second inflatable chamber 1130c, and a third inflatable chamber 1140c. The first inflatable chamber 1120c couples to the housing. The second inflatable chamber 1130c couples to the first inflatable chamber 1120c. The third inflatable chamber 1140c couples to the second inflatable chamber 1130c. A proximal end 1143c of the third inflatable chamber 1140c couples at the positioning coupling 1165c to an inboard panel 1121c of the first inflatable chamber 1120c. The positioning coupling 1165c may draw the proximal end 1143c of the third inflatable chamber 1140c rearward toward a proximal portion of the inboard panel 1121c of the first inflatable chamber 1120c. The configuration of the first, second, and third inflatable chambers 1120c, 1130c, 1140c may configure the third inflatable chamber 1140c to engage at least a portion of the pelvis 58 of the occupant 50.

FIG. 11D is a top view of a side inflatable cushion 1110d having two inflatable chambers 1120d, 1130d and a positioning tether 1160d. In the embodiment of FIG. 11D, the side inflatable cushion 1110d can include a first inflatable chamber 1120d, a second inflatable chamber 1130d, and the positioning tether 1160d. The first inflatable chamber 1120d couples to the housing. The second inflatable chamber 1130d couples to the first inflatable chamber 1120d. The positioning tether 1160d couples to a proximal portion of an inboard panel 1121d of the first inflatable chamber 1120d, and to a proximal end 1133d of the second inflatable chamber 1130d. In another embodiment, the positioning tether 1160d may couple to a proximal portion of an inboard panel 1131d of the second inflatable chamber 1130d, thereby wrapping around, or crossing over the proximal end 1133d of the second inflatable chamber 1130d. The positioning tether 1160d may draw the proximal end 1133d of the second inflatable chamber 1130d inward and rearward such that the second inflatable chamber 1130d may engage at least a portion of the pelvis 58 of the occupant 50. In another embodiment, the positioning tether 1160d may be supplanted by a positioning panel similar to the positioning panel 861 in FIGS. 8A-8B, or similar to the positioning panel 963 in FIGS. 9A-9B. In some embodiments, the side inflatable cushion 1110d may be flipped laterally (mirrored) such that the tether 1160d is configured to rest toward or against a reaction surface, such as a door or a center console. Accordingly, when the side inflatable cushion 1110d is in a deployed state, at least a portion of the first inflatable chamber 1120d may be disposed within at least a portion of a pathway of an occupant moving from a vehicle occupant position primarily in the forward direction during a vehicle impact event. Other side inflatable cushions of the present disclosure may also be flipped laterally as appropriate.

Figure 11F:
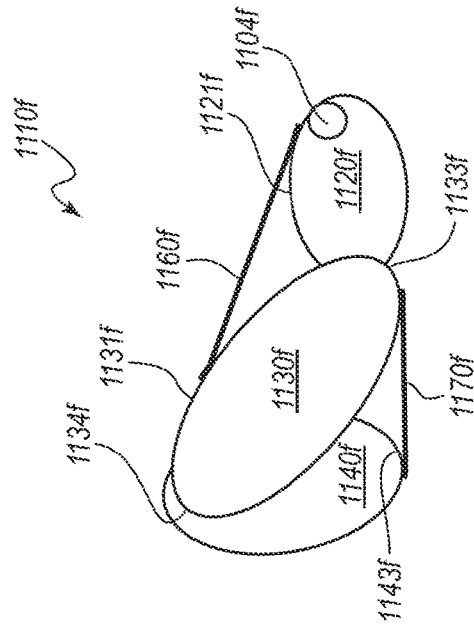
FIG. 11F is a top view of a side inflatable cushion, according to another embodiment of the present disclosure, in a deployed state.
Figure 11H:
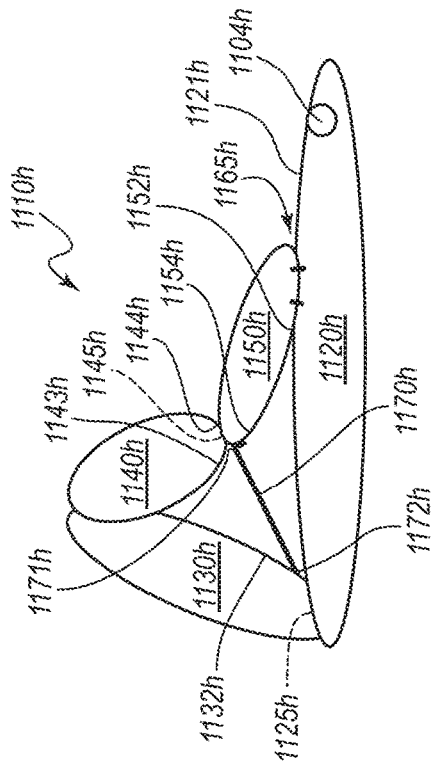
FIG. 11H is a top view of a side inflatable cushion, according to another embodiment of the present disclosure, in a deployed state.
Figure 11E:
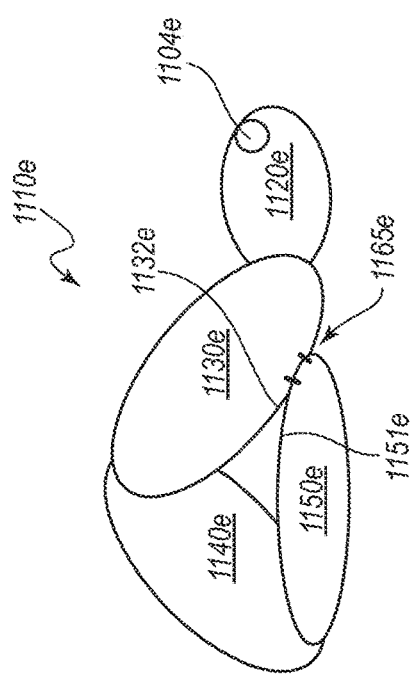
FIG. 11E is a top view of a side inflatable cushion, according to another embodiment of the present disclosure, in a deployed state.

FIG. 11E is a top view of a side inflatable cushion 1110e having four inflatable chambers 1120e, 1130e, 1140e, 1150e with a positioning coupling 1165e. In the embodiment of FIG. 11E, the side inflatable cushion 1110e can include a first inflatable chamber 1120e, a second inflatable chamber 1130e, a third inflatable chamber 1140e, a fourth inflatable chamber 1150e, and the positioning coupling 1165e. The first inflatable chamber 1120e couples to the housing. The second inflatable chamber 1130e couples to the first inflatable chamber 1120e; the third inflatable chamber 1140e couples to the second inflatable chamber 1130e; and the fourth inflatable chamber 1150e couples to the third inflatable chamber 1140e. The fourth inflatable chamber 1150e also couples at a distal portion of an inboard panel 1151e of the fourth inflatable chamber 1150e to a proximal portion of an outboard panel 1132e of the second inflatable chamber 1130e. The coupling of the fourth inflatable chamber 1150e to both a distal portion of the third inflatable chamber 1140e and a proximal portion of the outboard panel 1132e of the second inflatable chamber 1130e may dispose the second inflatable chamber 1130e rearward and inward to receive at least a portion of the pelvis 58 of the occupant 50.

FIG. 11F is a top view of a side inflatable cushion 1110f having three inflatable chambers 1120f, 1130f, 1140f and two positioning tethers 1160f, 1170f. In the embodiment of FIG. 11F, the side inflatable cushion 1110f can include a first inflatable chamber 1120f, a second inflatable chamber 1130f, a third inflatable chamber 1140f, a proximal positioning tether 1160f, and a distal positioning tether 1170f. The first inflatable chamber 1120f couples to the housing; the second inflatable chamber 1130f couples to the first inflatable chamber 1120f; and the third inflatable chamber 1140f couples to the second inflatable chamber 1130f. The proximal positioning tether 1160 couples to a proximal portion of an inboard panel 1121f of the first inflatable chamber 1120f, and to a distal portion of an inboard panel 1131f of the second inflatable chamber 1130f. The distal positioning tether 1170f couples at or near a proximal end 1133f of the second inflatable chamber 1130f and at or near a proximal end 1143f of the third inflatable chamber 1140f. The distal positioning tether 1170f may draw the proximal end 1143f of the third inflatable chamber 1140f rearward such that the proximal end 1143f of the third inflatable chamber 1140f may be more rearward than a distal end 1134f of the second inflatable chamber 1130f. The configuration of the third inflatable chamber 1140f and the distal positioning tether 1170f may dispose the second inflatable chamber 1130f inward so as to receive at least a portion of the pelvis 58 of the occupant 50. In another embodiment, either or both positioning tethers 1160f, 1170f may be supplanted by positioning panel(s) similar to the positioning panel 861 in FIGS. 8A-8B, or similar to the positioning panel 963 in FIGS. 9A-9B.

Figure 11G:
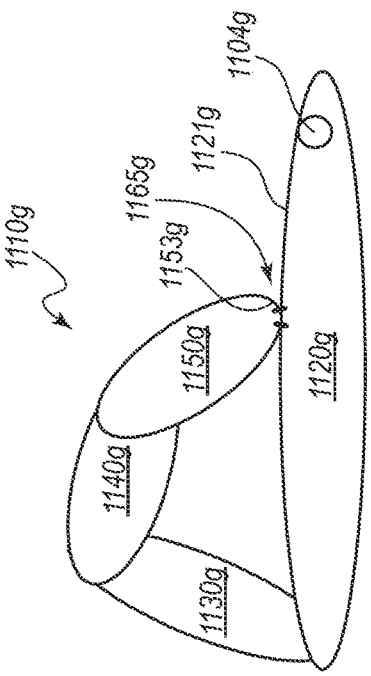
FIG. 11G is a top view of a side inflatable cushion, according to another embodiment of the present disclosure, in a deployed state.

FIG. 11G is a top view of a side inflatable cushion 1110g having four inflatable chambers 1120g, 1130g, 1140g, 1150g and a positioning coupling 1165g. In the embodiment of FIG. 11G, the side inflatable cushion 1110g can include a first inflatable chamber 1120g, a second inflatable chamber 1130g, a third inflatable chamber 1140g, and a fourth inflatable chamber 1150g. The first inflatable chamber 1120g couples to the housing. The second inflatable chamber 1130g couples to the first inflatable chamber 1120g; the third inflatable chamber 1140g couples to the second inflatable chamber 1130g; and the fourth inflatable chamber 1150g couples to the third inflatable chamber 1140g. A proximal end 1153g of the fourth inflatable chamber 1150g couples at a positioning coupling 1165g to a medial portion of an inboard panel 1121g of the first inflatable chamber 1120g. The coupling of the proximal end 1153g of the fourth inflatable chamber 1150g to a medial portion of the inboard panel 1121g of the first inflatable chamber 1120g may configure the second, third, and fourth inflatable chambers 1130g, 1140g, 1150g inward and successively further rearward to dispose the fourth inflatable chamber 1150g rearward and inward so as to receive at least a portion of the pelvis 58 of the occupant 50.

FIG. 11H is a top view of a side inflatable cushion 1110h having four inflatable chambers 1120h, 1130h, 1140h, 1150h and a positioning tether 1170h. In the embodiment of FIG. 11H, the side inflatable cushion 1110h can include a first inflatable chamber 1120h, a second inflatable chamber 1130h, a third inflatable chamber 1140h, a fourth inflatable chamber 1150h, and the positioning tether 1170h. The first inflatable chamber 1120h couples to the housing; the second inflatable chamber 1130h couples to the first inflatable chamber 1120h; the third inflatable chamber 1140h couples to the second inflatable chamber 1130h; and the fourth inflatable chamber 1150h couples to the third inflatable chamber 1140h. A proximal portion of an outboard panel 1152h of the fourth inflatable chamber 1150h couples at a positioning coupling 1165h to a medial portion of an inboard panel 1121h of the first inflatable chamber 1120h.

The positioning tether 1170h can include a proximal end 1171h and a distal end 1172h. The proximal end 1171h of the positioning tether 1170h couples at or near a proximal end 1143h of the third inflatable chamber 1140h, or at or near a distal end 1154h of the fourth inflatable chamber 1150h, or at or near an interface 1145h of the third inflatable chamber 1140h to the fourth inflatable chamber 1150h. The distal end 1172h of the positioning tether 1170h couples at or near a distal portion of an outboard panel 1132h of the second inflatable chamber, or at or near a distal portion of the inboard panel 1121h of the first inflatable chamber 1120h, or at or near an interface 1125h of the first inflatable chamber 1120h to the second inflatable chamber 1130h. The positioning tether 1170h may draw forward and outward the distal portion of the fourth inflatable chamber 1150h and a proximal portion of the third inflatable chamber 1140h at or near the chamber interface 1145h so as to configure the fourth inflatable chamber 1150h and third inflatable chamber 1140h to engage at least a portion of the pelvis 58 of the occupant 50.

FIGS. 12A-12D are top views of side inflatable cushions 1210a-1210d with side inflatable cushions 1210a-1210d deployed and at least partially inflated, and having varying configurations of apertures 1228a-1228d for the communication of inflation gas. Inflators 1204a-1204d are shown in FIGS. 12A-12D for reference. In the embodiments of FIGS. 12A-12D, the side inflatable cushions 1210a-1210d can include three inflatable chambers 1220a-1220d, 1230a-1230d, and 1240a-1240d, respectively. In FIGS. 12A-12D, the side inflatable cushions 1210a-1210d are shown deployed and at least partially inflated as from an installation to an inboard side of the seat back 34 of FIGS. 1A-1C. The embodiments in FIGS. 12A-12D of the airbag assemblies may be suitable for installation to either side of the seat back 34, or to an adjacent vehicle structure such as, for example, a door, a door post, or a center console. FIGS. 12A-12D illustrate four embodiments of arrangements of apertures 1228a-1228b for use in side inflatable cushions 1210a-1210d having three inflatable chambers 1220a-1220d, 1230a-1230d, and 1240a-1240d, respectively. That is, FIGS. 12A-12D illustrate four possible paths for inflation gas to inflate the side inflatable cushions 1220a-1220d having three inflatable cushions 1220a-1220d, 1230a-1230d, and 1240a-1240d, respectively. Embodiments of the airbag assemblies provided herein having different numbers of inflatable chambers may employ similar arrangements of apertures to achieve similar inflation paths.

Figure 12A:
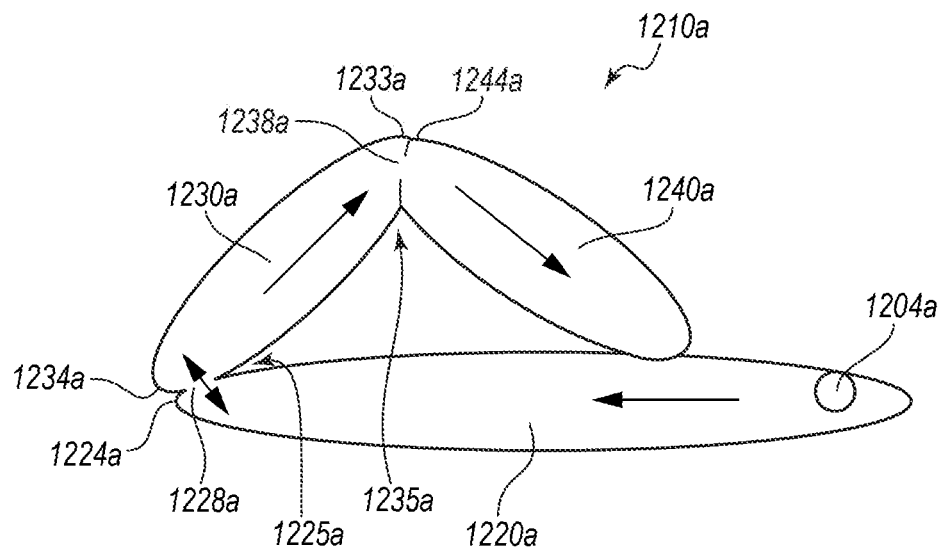
FIG. 12A is a top view of a side inflatable cushion, according to another embodiment of the present disclosure, in a deployed state.

FIG. 12A is a top view of a side inflatable cushion 1210a in which inflation gas is introduced to each of the inflatable chambers 1220a, 1230a, 1240a in a generally sequential and linear manner. In the embodiment of FIG. 12A, the side inflatable cushion 1210a may include an interface 1225a between the first and second inflatable chambers 1220a, 1230a at or near a distal end 1224a of the first inflatable chamber 1220a and at or near a distal end 1234a of the second inflatable chamber 1230a. The side inflatable cushion 1210a may include an interface 1235a between the second and third inflatable chambers 1230a, 1240a at or near a proximal end 1233a of the second inflatable chamber 1230a and at or near a distal end 1244a of the third inflatable chamber 1240a.

An aperture 1228a may be located at, near, or within the interface 1225a to permit fluid communication of inflation gas from or between the first and second inflatable chambers 1220a, 1230a. An aperture 1238a may be located at, near, or within the interface 1235a to permit fluid communication of inflation gas from or between the second and third inflatable chambers 1230a, 1240a. In at least one embodiment, the apertures 1228a, 1238a may permit fluid communication in only one direction, or unidirectionally, such that inflation gas may flow from the first inflatable chamber 1220a to the second inflatable chamber 1230a and from the second inflatable chamber 1230a to the third inflatable chamber 1240a. In another embodiment, the apertures 1228a, 1238a may permit fluid communication of inflation gas in either direction, or bidirectionally. In yet another embodiment, one aperture, either 1228a or 1238a, may permit unidirectional fluid communication of inflation gas while the other aperture 1228a, 1238a may permit bidirectional fluid communication of inflation gas.

Figure 12B:
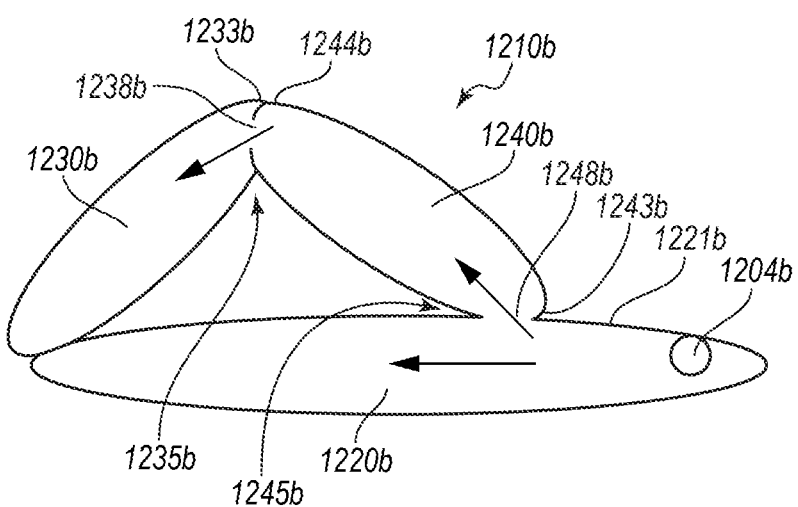
FIG. 12B is a top view of a side inflatable cushion, according to another embodiment of the present disclosure, in a deployed state.

FIG. 12B is a top view of a side inflatable cushion 1210b in which inflation gas is introduced to each of the inflatable chambers 1220b, 1230b, 1240b in another generally sequential and linear manner. In the embodiment of FIG. 12B, the side inflatable cushion 1210b may include an interface 1235b between the second and third inflatable chambers 1230b, 1240b at or near a proximal end 1233b of the second inflatable chamber 1230b and at or near a distal end 1244b of the third inflatable chamber 1240b. The side inflatable cushion 1210b may include an interface 1245b between the first and third inflatable chambers 1220b, 1240b and located at or near a proximal end 1243b of the third inflatable chamber 1240b and at a medial portion of an inboard panel 1221b of the first inflatable chamber 1220b.

An aperture 1248b may be located at, near, or within the interface 1245b to permit fluid communication of inflation gas from or between the first and third inflatable chambers 1220b, 1240b. An aperture 1238b may be located at, near, or within the interface 1235b to permit fluid communication of inflation gas from or between the third and second inflatable chambers 1240b, 1230b. In at least one embodiment, the apertures 1248b, 1238b may permit unidirectional fluid communication such that inflation gas may flow from the first inflatable chamber 1220b to the third inflatable chamber 1240b and from the third inflatable chamber 1240b to the second inflatable chamber 1230b. In another embodiment, the apertures 1248b, 1238b may permit bidirectional fluid communication of inflation gas. In yet another embodiment, one aperture, either 1248b or 1238b, may permit unidirectional fluid communication of inflation gas while the other aperture 1248b, 1238b may permit bidirectional fluid communication of inflation gas.

Figure 12C:
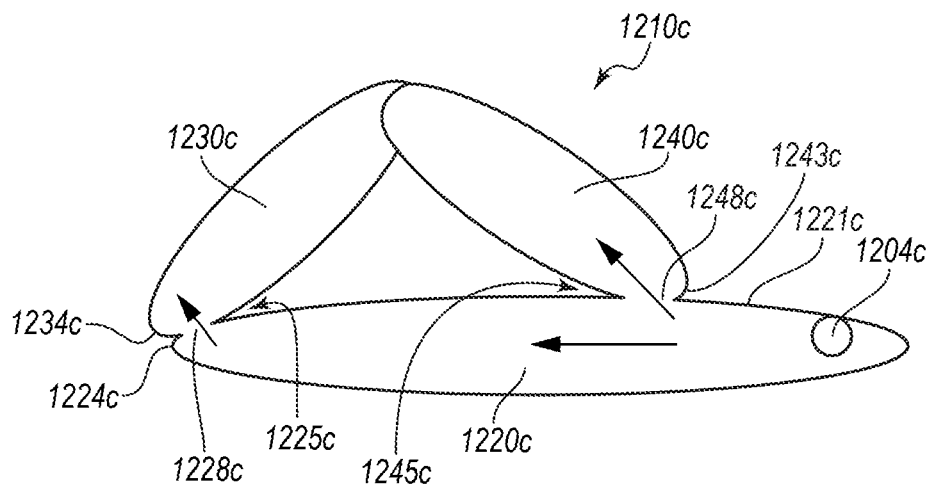
FIG. 12C is a top view of a side inflatable cushion, according to another embodiment of the present disclosure, in a deployed state.

FIG. 12C is a top view of a side inflatable cushion 1210c in which inflation gas is introduced first to the first inflatable chamber 1220c and then to the second and third inflatable chambers 1230c, 1240c in a generally parallel manner. In the embodiment of FIG. 12C, the side inflatable cushion 1210c may include an interface 1225c between the first and second inflatable chambers 1220c, 1230c at or near a distal end 1224c of the first inflatable chamber 1220c and at or near a distal end 1234c of the second inflatable chamber 1230c. The side inflatable cushion 1210c may include an interface 1245c between the first and third inflatable chambers 1220c, 1240c at or near a proximal end 1243c of the third inflatable chamber 1240c and at a medial portion of an inboard panel 1221c of the first inflatable chamber 1220c.

An aperture 1248c may be located at, near, or within the interface 1245c to permit fluid communication of inflation gas from or between the first and third inflatable chambers 1220c, 1240c. An aperture 1228c may be located at, near, or within the interface 1225c to permit fluid communication of inflation gas from or between the first and second inflatable chambers 1220c, 1230c. In at least one embodiment, the apertures 1248c, 1228c may permit unidirectional fluid communication such that inflation gas may flow from the first inflatable chamber 1220c to the third inflatable chamber 1240c and from the first inflatable chamber 1220c to the second inflatable chamber 1230c. In another embodiment, the apertures 1248c, 1228c may permit bidirectional fluid communication of inflation gas. In yet another embodiment, one aperture, either 1248c or 1228c, may permit unidirectional fluid communication of inflation gas while the other aperture 1248c, 1228c may permit bidirectional fluid communication of inflation gas.

Figure 12D:
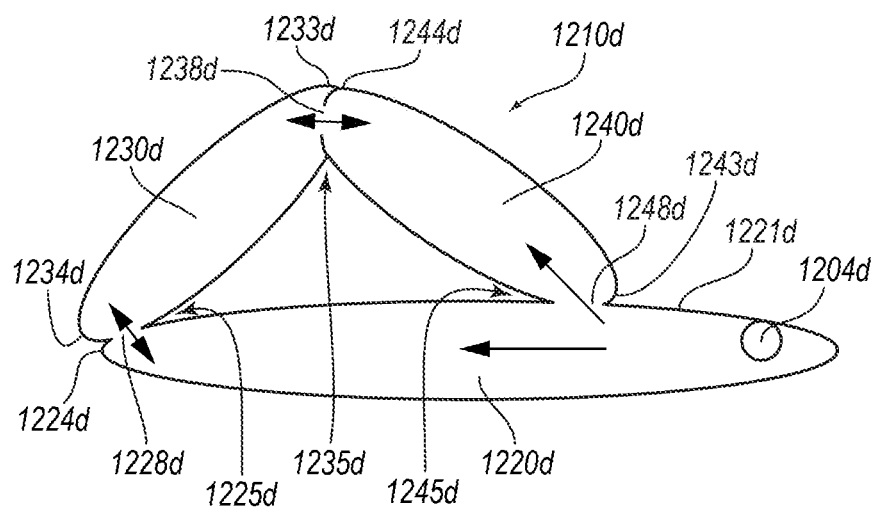
FIG. 12D is a top view of a side inflatable cushion, according to another embodiment of the present disclosure, in a deployed state.

FIG. 12D is a top view of a side inflatable cushion 1210d in which inflation gas is introduced to each of the inflatable chambers 1220d, 1230d, 1240d in a generally parallel and circular manner. In the embodiment of FIG. 12D, the side inflatable cushion 1210d may include an interface 1225d between the first and second inflatable chambers 1220d, 1230d at or near a distal end 1224d of the first inflatable chamber 1220d and at or near a distal end 1234d of the second inflatable chamber 1230d. The side inflatable cushion 1210d may include an interface 1235d between the second and third inflatable chambers 1230d, 1240d at or near a proximal end 1233d of the second inflatable chamber and at or near a distal end 1244d of the third inflatable chamber 1240d. The side inflatable cushion 1210d may include an interface 1245d between the first and third inflatable chambers 1220d, 1240d and located at or near a proximal end 1243d of the third inflatable chamber 1240d and at a medial portion of an inboard panel 1221d of the first inflatable chamber 1220d.

An aperture 1228d may be located at, near, or within the interface 1225d to permit fluid communication of inflation gas from or between the first and second inflatable chambers 1220d, 1230d. An aperture 1238d may be located at, near, or within the interface 1235d to permit fluid communication of inflation gas from or between the second and third inflatable chambers 1230d, 1240d. An aperture 1248d may be located at, near, or within the interface 1245d to permit fluid communication of inflation gas from or between the first and third inflatable chambers 1220d, 1240d.

In one embodiment, each of the apertures 1228d, 1238d, 1248d may permit unidirectional fluid communication such that inflation gas may flow from the first inflatable chamber 1220d to the second inflatable chamber 1230d, and from the second inflatable chamber 1230d to the third inflatable chamber 1240d, and from the third inflatable chamber 1240d to the first inflatable chamber 1220d. In other words, the configuration of the apertures 1228d, 1238d, 1248d may permit inflation gas to circulate throughout the side inflatable cushion 1210d during ride down until the side inflatable cushion 1210d deflates. In another embodiment one, two, or all three of the apertures 1228*d*, 1238*d*, 1248*d* may provide bidirectional fluid communication of inflation gas.

Throughout this specification, the phrases "coupled to" and "in communication with" refer to any form of interaction between two or more entities, including mechanical, electrical, magnetic, electromagnetic, fluid, and thermal interaction. Two components may be coupled to each other even though they are not in direct contact with each other.

As used herein, "inboard" refers to a direction toward a centerline of a vehicle, and "outboard" refers to a direction out of the vehicle and away from a centerline of the vehicle.

The terms "engaged by" and "engagement with" as used in this disclosure generally refer to any interaction between two or more entities, and this interaction may, or may not, occur in a particular manner or fashion, or at a particular time. Such interaction between the entities may not be requisite to a particular purpose or claim of the instant disclosure. For example, an airbag cushion may be "engaged by" or in "engagement with" a vehicle occupant during a portion of a collision event. Such "engagement" may, or may not, occur as a result of the airbag cushion deploying, or the occupant impacting upon the airbag cushion, or during ride down following the collision.

The phrase "ride down" as used in this disclosure bears the ordinary meaning of the words relative to inflatable airbag systems. That is, "ride down" typically involves an occupant in contact with an inflatable airbag cushion for some period of time during which the inflatable airbag cushion may support and nominally protect to some degree the occupant from impact(s) with some structure(s)/component(s) of a vehicle, and during which the inflatable airbag cushion may partially deflate to ameliorate deceleration forces.

The phrase "fluid communication" is used in its ordinary sense, and is broad enough to refer to arrangements in which a fluid (e.g., a gas or a liquid) can flow from one element to another element when the elements are in fluid communication with each other.

The terms "a" and "an" can be described as one, but not limited to one. For example, although the disclosure may recite an airbag having "a chamber," the disclosure also contemplates that the airbag can have two or more chambers.

The terms "longitudinal" and "longitudinally" refer to a direction or orientation extending or spanning between a front of a vehicle and a rear of the vehicle.

As used herein, the terms "forward" and "rearward" are used with reference to the front and back of the relevant vehicle. For example, an airbag cushion that deploys in a rearward direction deploys toward the back of a vehicle. Furthermore, other reference terms, such as "horizontal," are used relative to a vehicle in which an airbag assembly is installed, unless it is clear from context that a different reference frame is intended. Thus, a term such as "horizontal" is used relative to the vehicle, whether or not the vehicle itself is oriented horizontally (e.g., is positioned upright on level ground) or angled relative to true horizontal (e.g., is positioned on a hill).

Unless otherwise stated, all ranges include both endpoints and all numbers between the endpoints.

The phrase "vehicle occupant position" refers to a position in which an occupant is generally positioned when seated in a seat of a vehicle. The term "occupant" refers to a person or crash test dummy within a vehicle.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 ¶ 6. It will be apparent to those having reasonable skill in the art that changes may be made to the details of the above-described embodiments without departing from the underlying principles of the invention. Embodiments of the invention in which an exclusive property or privilege is claimed are defined as follows.

What is claimed is:

1. An airbag assembly comprising:
   a side inflatable cushion comprising:
      a first inflatable chamber to be coupled at a proximal end to an inflator;
      a second inflatable chamber extending from a distal end of the first inflatable chamber;
      a third inflatable chamber extending from a distal end of the second inflatable chamber; and
      a first connector having a first end coupled to at least one of the first inflatable chamber or the second inflatable chamber and a second end coupled to the third inflatable chamber;
      wherein the side inflatable cushion is configured to receive inflation gas from the inflator to expand the side inflatable cushion from a packaged state to a deployed state,
      wherein the second inflatable chamber in the deployed state protrudes transverse to a longitudinal axis of a vehicle such that the second inflatable chamber is configured to receive at least a portion of a pelvis of a vehicle occupant moving from a vehicle occupant position primarily in a forward direction relative to the vehicle during a vehicle impact event.

2. The airbag assembly of claim 1, wherein the first connector is configured to control a shape of the side inflatable cushion in the deployed state such that the second inflatable chamber is disposed within at least a portion of a pathway of the vehicle occupant moving from the vehicle occupant position primarily in the forward direction relative to the vehicle during the vehicle impact event.

3. The airbag assembly of claim 1, wherein the first end of the first connector is coupled to at least one of a distal portion of an outboard surface of the first inflatable chamber or a proximal portion of an outboard surface of the second inflatable chamber and the second end of the first connector is coupled to a distal end of an outboard surface of the third inflatable chamber.

4. The airbag assembly of claim 1, further comprising a second connector, wherein a first end of the second connector is coupled to a proximal portion of an inboard surface of the first inflatable chamber and a second end of the second connector is coupled to a distal end of an inboard surface of the second inflatable chamber.

5. The airbag assembly of claim 1, wherein the first connector comprises at least one of a strap or a panel.

6. The airbag assembly of claim 1, wherein heights of the first, second, and third inflatable chambers are substantially equal, and
wherein the second inflatable chamber is further configured to receive at least a portion of a torso of the vehicle occupant moving from the vehicle occupant position primarily in the forward direction relative to the vehicle during the vehicle impact event.

7. The airbag assembly of claim 1, wherein a height of the first inflatable chamber is greater than heights of the second and third inflatable chambers.

8. The airbag assembly of claim 1, wherein the second inflatable chamber is further configured to receive at least a portion of a torso of the vehicle occupant moving from the vehicle occupant position primarily in the forward direction relative to the vehicle during the vehicle impact event.

9. The airbag assembly of claim 1, wherein a height of the first inflatable chamber is greater than a height of the second inflatable chamber, wherein the height of the second inflatable chamber is greater than a height of the third inflatable chamber, and
wherein the second inflatable chamber is further configured to receive at least a portion of a torso of the vehicle occupant moving from the vehicle occupant position primarily in the forward direction relative to the vehicle during the vehicle impact event.

10. An airbag assembly comprising:
an inflator; and
a side inflatable cushion comprising:
a first inflatable chamber coupled to the inflator;
a second inflatable chamber extending from a distal end of the first inflatable chamber;
a third inflatable chamber extending from a distal end of the second inflatable chamber; and
a first connector coupling two of the inflatable chambers to each other,
wherein the side inflatable cushion is configured to receive inflation gas from the inflator to expand the side inflatable cushion from a packaged state within a housing to a deployed state, and
wherein a first receiving portion of the side inflatable cushion in the deployed state protrudes transverse to a longitudinal axis of a vehicle to a position at least partially forward of a vehicle occupant position, the first receiving portion configured to receive at least a portion of a pelvis of a vehicle occupant moving from the vehicle occupant position primarily in a forward direction relative to the vehicle during a vehicle impact event.

11. The airbag assembly of claim 10, wherein the first connector is configured to control a shape of the side inflatable cushion when in the deployed state such that the first receiving portion of the side inflatable cushion is disposed within at least a portion of a pathway of the vehicle occupant moving from the vehicle occupant position primarily in the forward direction relative to the vehicle during the vehicle impact event.

12. The airbag assembly of claim 10,
wherein the first connector comprises a panel extending between a proximal portion of an inboard surface of the first inflatable chamber and a distal portion of an inboard surface of the second inflatable chamber, and
wherein the first receiving portion is positioned on an inboard surface of the first connector.

13. The airbag assembly of claim 10,
wherein the first connector comprises a panel extending between a proximal portion of an inboard surface of the first inflatable chamber and a distal portion of an inboard surface of the third inflatable chamber, and
wherein the first receiving portion is positioned on an inboard surface of the first connector.

14. The airbag assembly of claim 10,
wherein the first connector comprises stitching between a distal portion of the third inflatable chamber and an inboard panel of the first inflatable chamber, and
wherein the first receiving portion is positioned on an inboard surface of the third inflatable chamber.

15. The airbag assembly of claim 10,
wherein the first connector comprises a panel extending between a proximal portion of an inboard surface of the first inflatable chamber and a distal portion of an inboard surface of the second inflatable chamber,
wherein a second connector extends between a distal portion of the third inflatable chamber and at least one of an outboard surface of a proximal end of the second inflatable chamber or an outboard surface of the distal end of the first inflatable chamber, and
wherein the first receiving portion is positioned on an inboard surface of the first connector.

16. A side inflatable airbag cushion comprising:
a first inflatable chamber to be coupled in fluid communication with an inflator;
a second inflatable chamber extending from a distal end of the first inflatable chamber;
a third inflatable chamber extending from a distal end of the second inflatable chamber; and
a first connector coupling a distal portion of the side inflatable airbag cushion to a proximal portion of the side inflatable airbag cushion, the side inflatable airbag cushion configured to receive inflation gas from the inflator to expand the side inflatable airbag cushion from a packaged state within a housing to a deployed state, wherein a first receiving portion of the side inflatable airbag cushion is configured to receive at least a portion of a pelvis of a vehicle occupant moving from a vehicle occupant position primarily in a forward direction relative to a vehicle during a vehicle impact event, and
wherein the side inflatable airbag cushion is configured such that when in the deployed state the first receiving portion is disposed within at least a portion of a pathway of the vehicle occupant moving from the vehicle occupant position primarily in the forward direction relative to the vehicle during the vehicle impact event.

17. The side inflatable airbag cushion of claim 16,
wherein the distal end of the second inflatable chamber is coupled to a distal end of the third inflatable chamber.

18. The side inflatable airbag cushion of claim 16
wherein the distal end of the second inflatable chamber is coupled to the distal end of the first inflatable chamber.

19. The side inflatable airbag cushion of claim 16, wherein the distal end of the third inflatable chamber is in fluid communication with the first inflatable chamber at an inboard surface of the first inflatable chamber.

* * * * *